US006188948B1

(12) United States Patent
Shivler, Jr.

(10) Patent No.: US 6,188,948 B1
(45) Date of Patent: Feb. 13, 2001

(54) VEHICLE ANTI-LOCK BRAKE SYSTEMS ASSEMBLY VERIFICATION SYSTEM

(75) Inventor: James P. Shivler, Jr., Springfield, OH (US)

(73) Assignee: Navistar International Transportation Corp., Chicago, IL (US)

( * ) Notice: Under 35 U.S.C. 154(b), the term of this patent shall be extended for 0 days.

(21) Appl. No.: 09/410,847

(22) Filed: Oct. 1, 1999

Related U.S. Application Data

(60) Provisional application No. 60/102,913, filed on Oct. 2, 1998, and provisional application No. 60/130,056, filed on Apr. 19, 1999.

(51) Int. Cl.[7] ............................... G06F 7/00; G06F 17/00
(52) U.S. Cl. ............................ 701/76; 701/70; 701/71; 73/121
(58) Field of Search ................................. 701/69, 70, 71, 701/72, 76; 73/121, 117.2, 123

(56) References Cited

U.S. PATENT DOCUMENTS

| | | |
|---|---|---|
| 4,024,756 | 5/1977 | Cline . |
| 4,192,180 | 3/1980 | Gerstenmeier et al. . |
| 4,805,447 | 2/1989 | Meguro et al. . |
| 4,912,969 | 4/1990 | Ishizeki . |
| 4,932,252 | 6/1990 | Bovenlander et al. . |
| 5,005,405 | 4/1991 | Ishizeki . |
| 5,327,781 | 7/1994 | Moran et al. . |
| 5,339,682 | 8/1994 | Watanabe et al. . |
| 5,483,824 | 1/1996 | Fukuda et al. . |
| 5,780,732 | 7/1998 | Gieseler et al. . |
| 5,889,947 | 5/1999 | Hall et al. . |

FOREIGN PATENT DOCUMENTS

| | | |
|---|---|---|
| 4-204347A | 7/1992 | (JP) . |
| 6-3225 | 1/1994 | (JP) . |
| 10-260111 | 9/1998 | (JP) . |

*Primary Examiner*—William A. Cuchlinski, Jr.
*Assistant Examiner*—Gertrude Arthur
(74) *Attorney, Agent, or Firm*—Jeffrey P. Calfa; Dennis Kelly Sullivan; Gilberto Hernandez

(57) ABSTRACT

A process for testing and the testing assembly for performing the process for testing an anti-lock brake system (ABS) for a vehicle after installation or work on the ABS without the need to test the vehicle for an ABS design braking event. The process involves engaging a testing unit computer to the electrical communication network of the vehicle and communicating with the Electronic Control Module (ECM) of the ABS. The vehicle is driven onto motorized rollers that can roll the wheels at low speeds without requiring vehicle movement. The testing unit computer makes a series of queries to the ECM to determine status of various parameters. Additionally, the portable computer is used to make directives to the ECM as far as cycling the ABS modulating valves such as the ABS hold solenoids and the ABS decay solenoids and the driver as far as braking or releasing the brake. The process is essentially a closed loop test of the completely installed ABS system without actually requiring a wheel lockup at speed to test vehicle response, that is inducing an ABS design event.

44 Claims, 20 Drawing Sheets

VEHICLE ANTI-LOCK BRAKE SYSTEMS ASSEMBLY VERIFICATION SYSTEM

This is a non-provisional application claiming priority under provisional patent application Ser. Nos. 60/102,913, filed Oct. 2, 1998, and 60/130,056, filed Apr. 19, 1999.

BACKGROUND OF INVENTION

This invention relates to a process for testing an anti-lock brake system (ABS) for a vehicle after installation or work on the ABS without the need to test the vehicle for an ABS design braking event. The process involves engaging a portable computer to the electrical communication network of the vehicle and communicating with the Electronic Control Unit (ECU) or Electronic Controller Module (ECM) of the ABS. The vehicle is driven onto motorized rollers that can roll the wheels at low speeds without requiring vehicle movement. The portable computer makes a series of queries to the ECU to determine status of various parameters. Additionally, the portable computer is used to make directives to the ECU as far as cycling the ABS hold solenoids and the ABS decay solenoids and the driver as far as braking.

SUMMARY OF INVENTION

The process is essentially a closed loop test of the completely installed ABS system without actually requiring a wheel lockup at speed to test vehicle response (a "design braking event"). Prior art involved either testing the individual components during various stages of assembly or making the vehicle perform a simulated ABS design braking event to test the system on a wheel lockup.

The ABS system on the vehicle is engaged to the electrical communication system of the vehicle that currently may be a J1587 or J1939 electrical network. The ABS system contains the following components for each vehicle wheel: a wheel speed sensor; an ABS hold solenoid; and an ABS decay solenoid. All these components are electrically engaged to the ECU that will be described here as either the ECU or the ECM. The wheel speed sensor generates a signal to the ECU that is proportional to the speed in miles per hour (mph) at which the wheel turns radially. The ABS hold solenoid when closed will lock out the supply of brake actuating fluid, whether it be air or hydraulic, from activating the particular brake on a wheel. Closing the ABS hold solenoid prevents a brake for a particular wheel to be applied. The ABS decay solenoid when closed causes the brake actuating fluid, whether it be air or hydraulic, to be released from application on the brake for a particular wheel. Opening the ABS decay solenoid will cause a brake for a particular wheel to be released. Under an ABS design initiation event where a wheel is locked up, the ECU of the ABS system will cycle the hold solenoid and the decay solenoid to mitigate or release the wheel lockup.

The testing equipment required for performing the process includes motorized wheel rollers that may be controlled through an external computer such as the manufacturing or maintenance facilities main computers. The rollers may rotate one or two wheels of an axle at a time or simultaneously and each contains a counter torque measuring apparatus which measures the vehicle wheel's resistance to movement. This resistance may be brought on by application of vehicle brakes or due to mechanical binding within the axle or brake. The portable computer for engagement to the electrical communication system of the vehicle and querying the ECU is comprised of an off-the-shelf portable computer (PC) engaged to a bar code scanner for reading the vehicle identification number (VIN) and a touch control screen for operation of the PC. In the preferred embodiment, the PC has a pentium processor and the bar code scanner and the touch control screen are powered from the keyboard connector of the PC.

The process contains the following steps:

1. The vehicle is located such that the a right side and a left side wheel for one axle rest each on one of the motorized rollers;
2. The portable PC is electrically connected to the onboard electrical communication network of the vehicle, preferably by plugging a connector into an outlet in a cab of the vehicle;
3. The PC queries the ECU as to the configuration of the ABS;
4. The PC compares the configuration from the ECU with the configuration associated with the specific vehicle as provided by the main facility testing computer, which may be a main frame computer;
5. If the configuration of the ABS recorded in the ECU differs from the main frame expected configuration, the PC directs the ECU to self query the components of the ABS through the onboard network;
6. If the configuration of the ABS on of step 4. or self checked in step 5. matches with the main frame expected, the configuration passes, otherwise the configuration fails;
7. The PC directs the ECU to report battery voltage with the voltage passing if at above a preset quantitative value, preferably twelve (12) volts;
8. The PC queries the ECU for the existence of any active faults within the ECU as defined by a Society of Automotive Engineering (SAE) standard, if no faults exist the ECU passes;
9. The correctness of left/right side connections to the ECU is verified when the rollers commence slowly rolling one of the wheels, preferably the right wheel of the axle, as the PC looks for the ECU to report that only the right (rolled) wheel is rolling at a particular speed, preferably slower than five (5) mph;
10. Without the drivers foot on the brake pedal, the rollers then commence rolling both of the wheels on the axle to be tested at a similar speed while the counter torque measuring devices on the motorized rollers measure resistance of the wheels against turning;
11. If the resistance of the wheels against turning does not rise above a pre-selected value, then the axle to be tested and brakes pass the mechanical binding test;
12. The rollers commence rolling the left wheel with the PC looking for the ECU to now report that both left and right wheels of the tested axle are rolling;
13. If both steps 11 and 12. show that the expected wheels rolled as detected by the ABS then the left/right side connections are passed;
14. The PC then alternatively directs the ECU to cycle the ABS hold solenoids for each of the wheels with the PC continuously querying the ECU as to brake actuating fluid pressure for each wheel, while the hold valve is closed the PC directs the driver of the vehicle to press constantly on the brake pedal, a passing hold solenoid being one where the downstream pressure does not increase upon the application of actuating fluid on the upstream side of the hold valve;
15. The PC then directs the driver of the vehicle to press constantly on the brake pedal while the PC then alternatively directs the ECU to cycle the ABS decay solenoids for each of the wheels with the PC continuously querying the ECU as to brake actuating fluid pressure for each wheel, a passing decay solenoid being one where the actuating pressure decreases to zero upon the cycling open of the ABS decay solenoid;

16. With the motorized rollers rotating both wheels simultaneously, the counter torque measuring devices of the motorized rollers, the PC directs the driver of the vehicle to apply constant pressure on the brake pedal;

17. The main frame computer compares the counter torque measured for each wheel to determine: (a) whether the brake for each wheel is providing sufficient braking power above a preset level, and (b) to compare the braking power between the two wheels to ensure the difference between the brakes does not exceed a preset level of difference in braking power;

18. Should both sub-steps of step 17 be within the specifications, the brakes are passed;

19. The vehicle is relocated to test another drive axle of the vehicle and steps 10 to 18 are repeated for the second drive axle with additional drive axles being tested similarly; and 20. A report indicating which test, passed or failed, is issued.

21. The process may be varied without departing from the main intent of the invention that is to test an ABS system on assembly without putting the system through a design-braking event.

DRAWINGS

Other objects and advantages of the invention will become more apparent upon perusal of the detailed description thereof and upon inspection of the drawings, in which.

Figure 5:
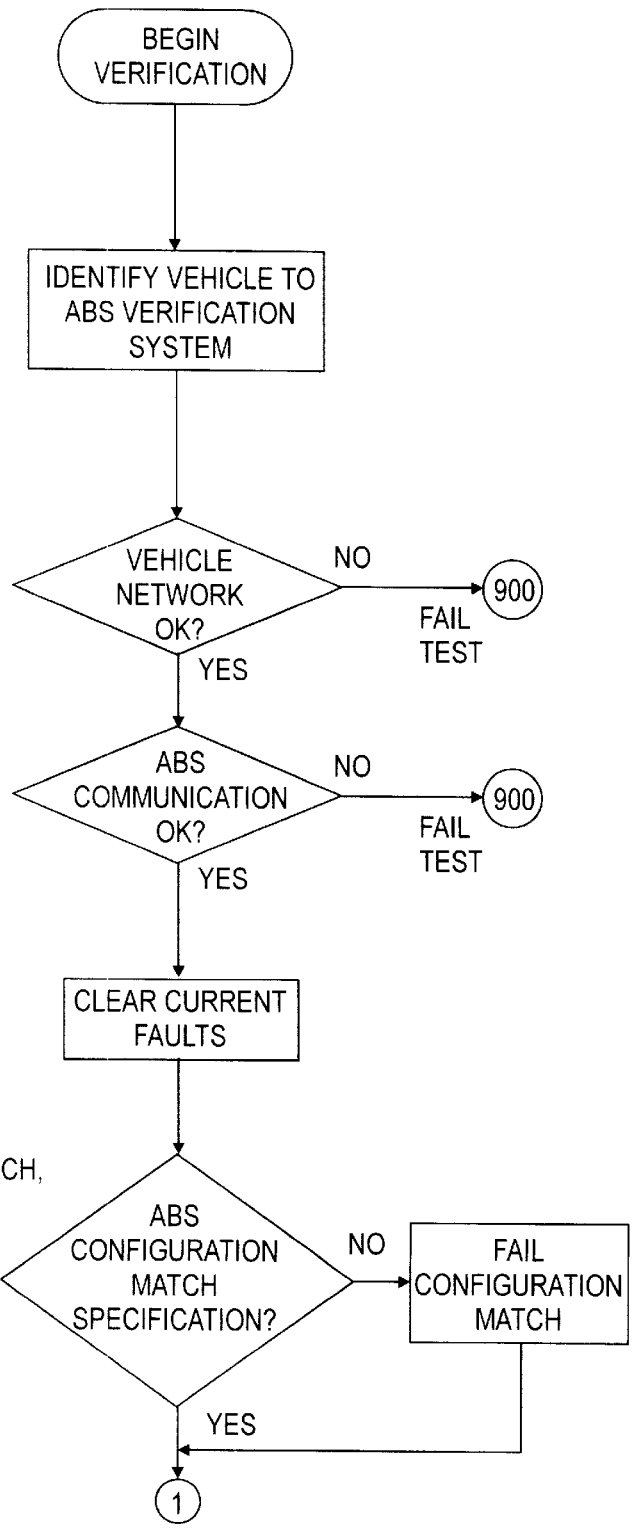
FIG. 5 is first portion of a further embodiment of a process of verifying antilock brake system assembly in a mobile vehicle in accordance with this invention.
Figure 6:
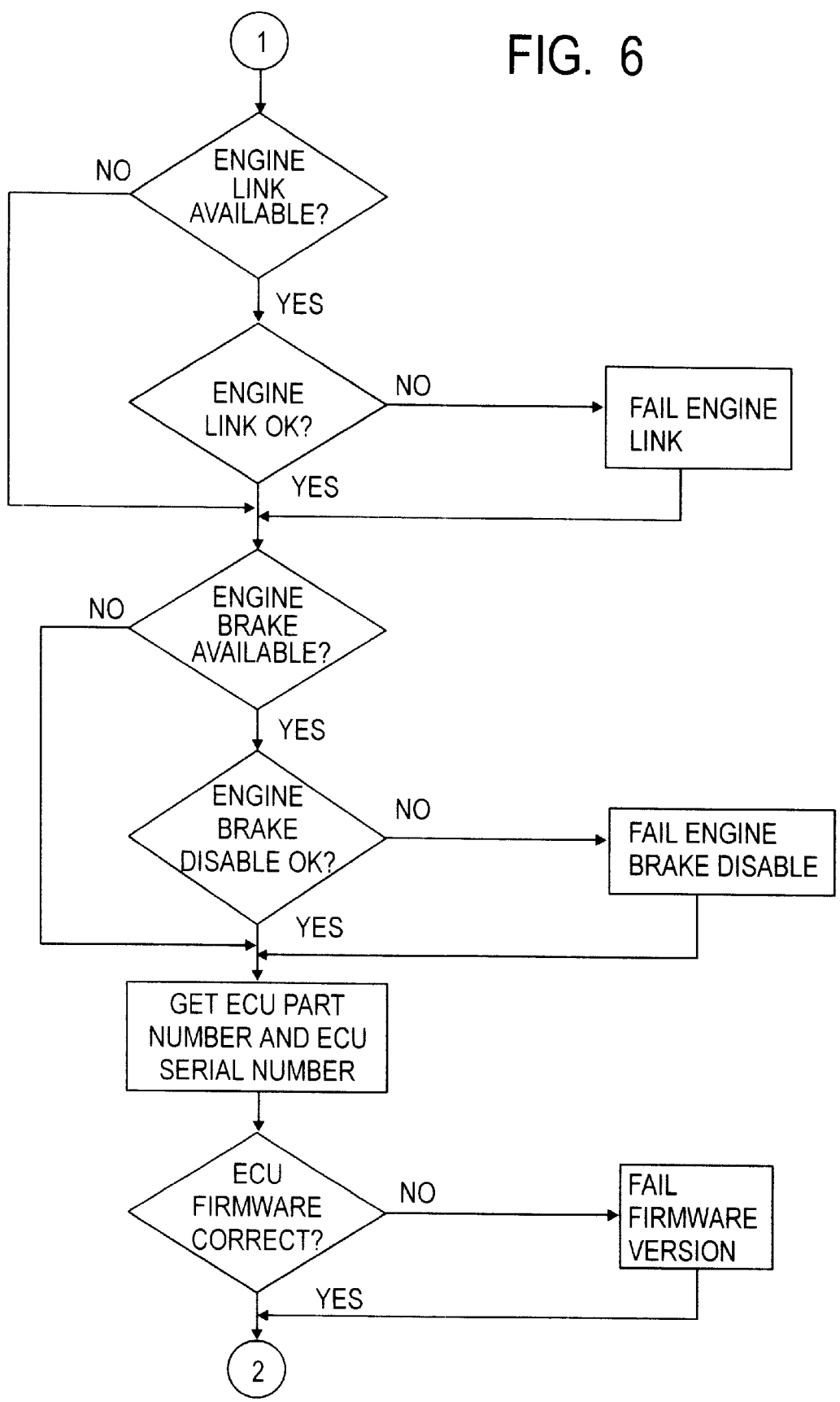
Figure 7:
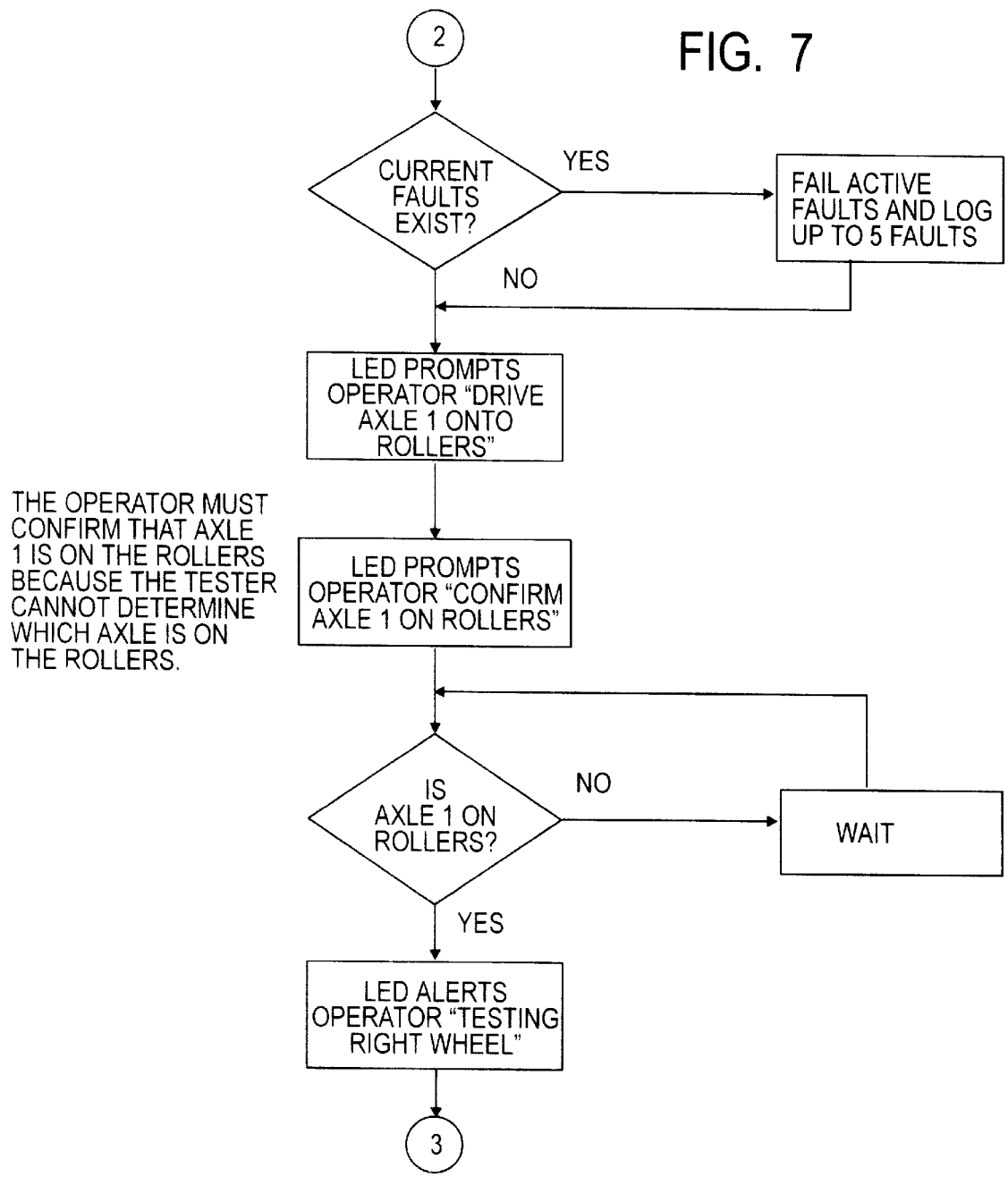
Figure 8:
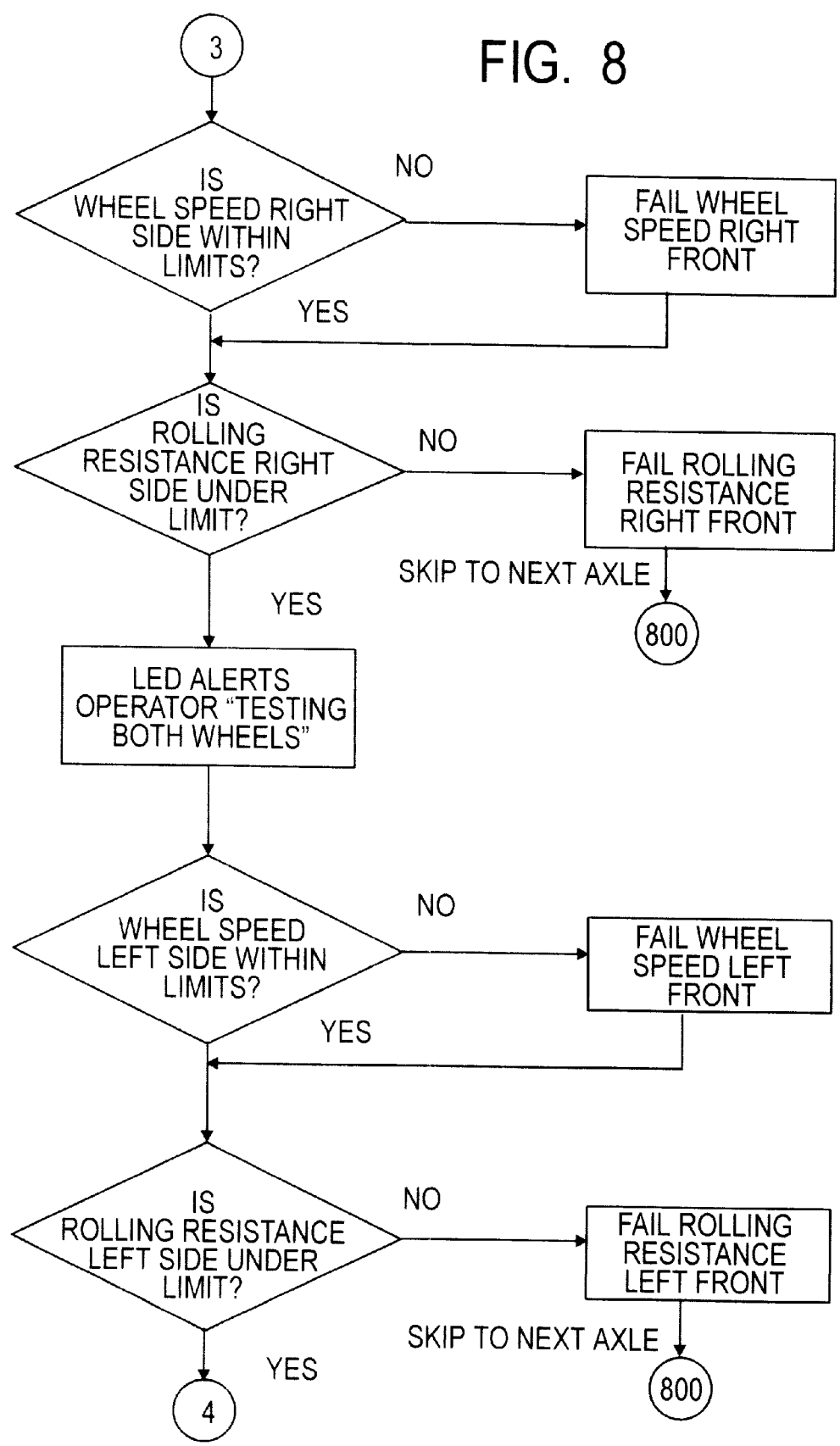
Figure 9:
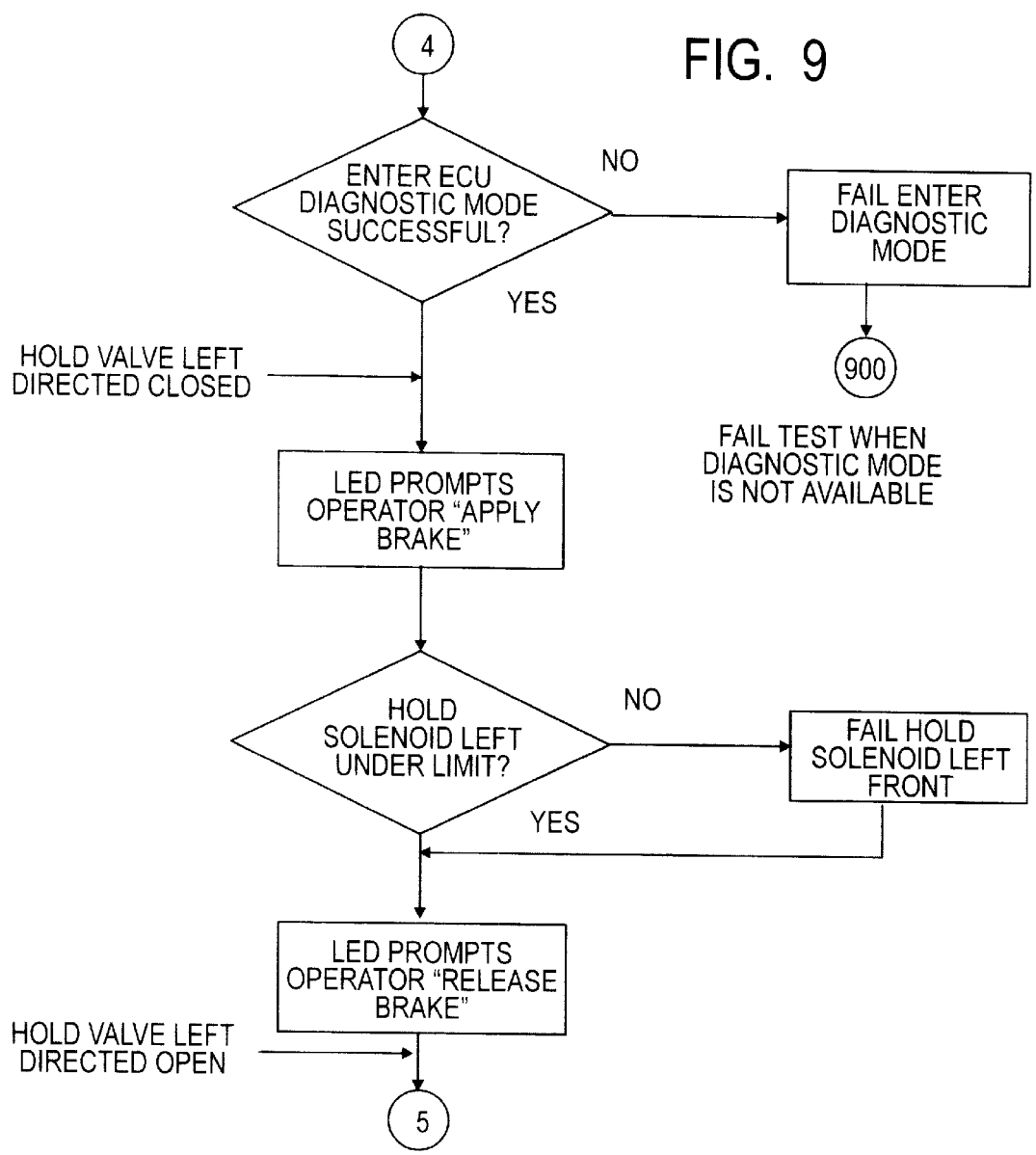
Figure 10:
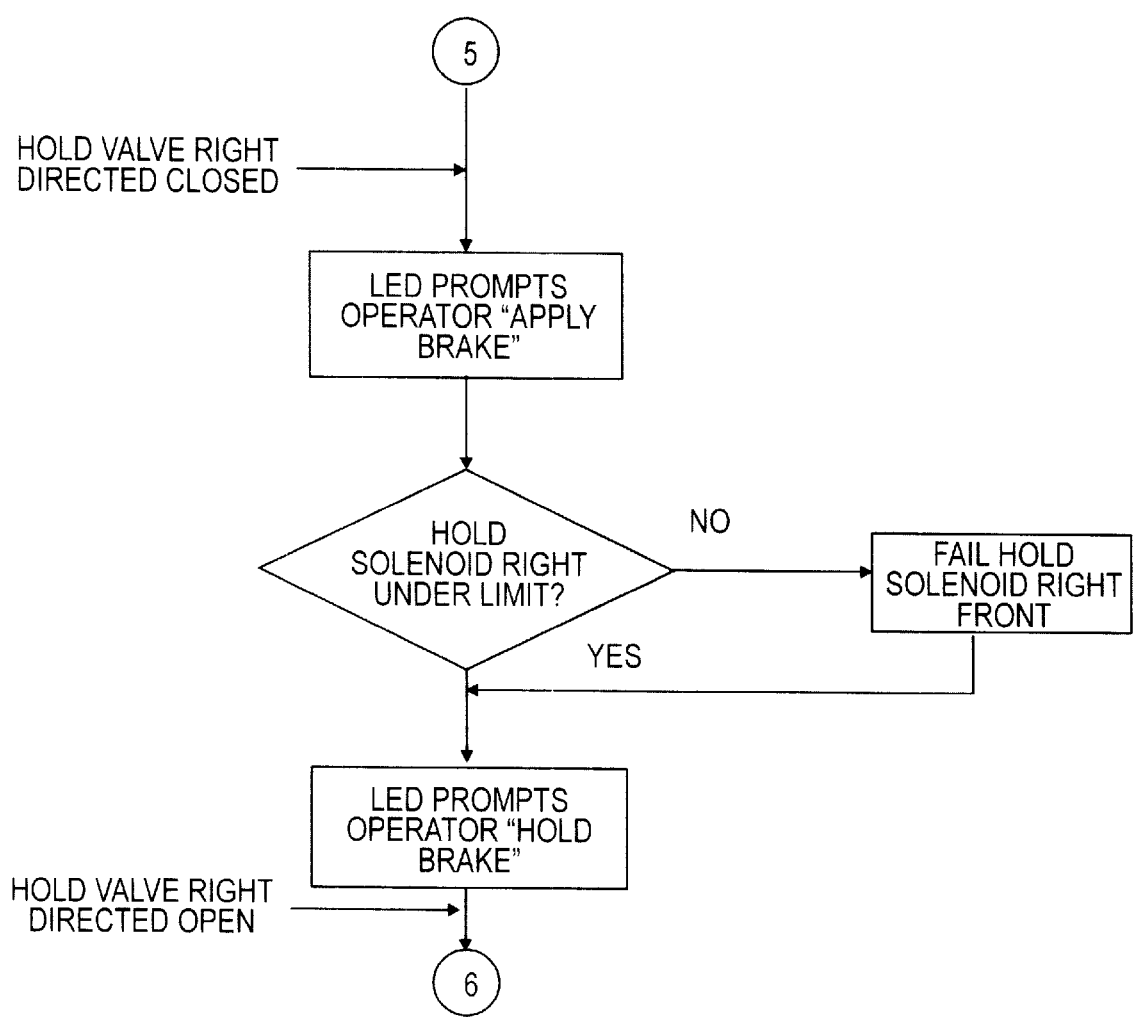
Figure 11:
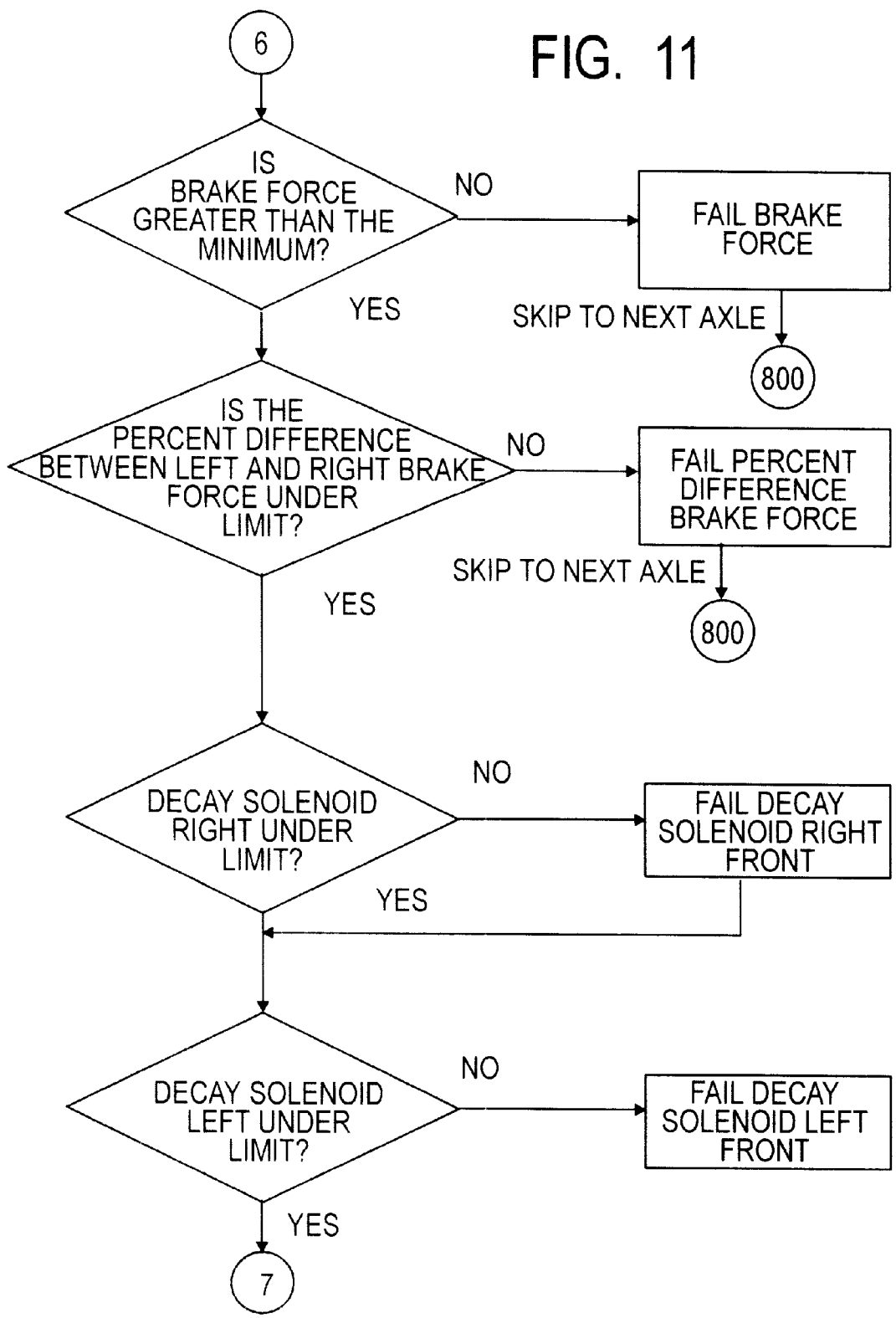
Figure 12:
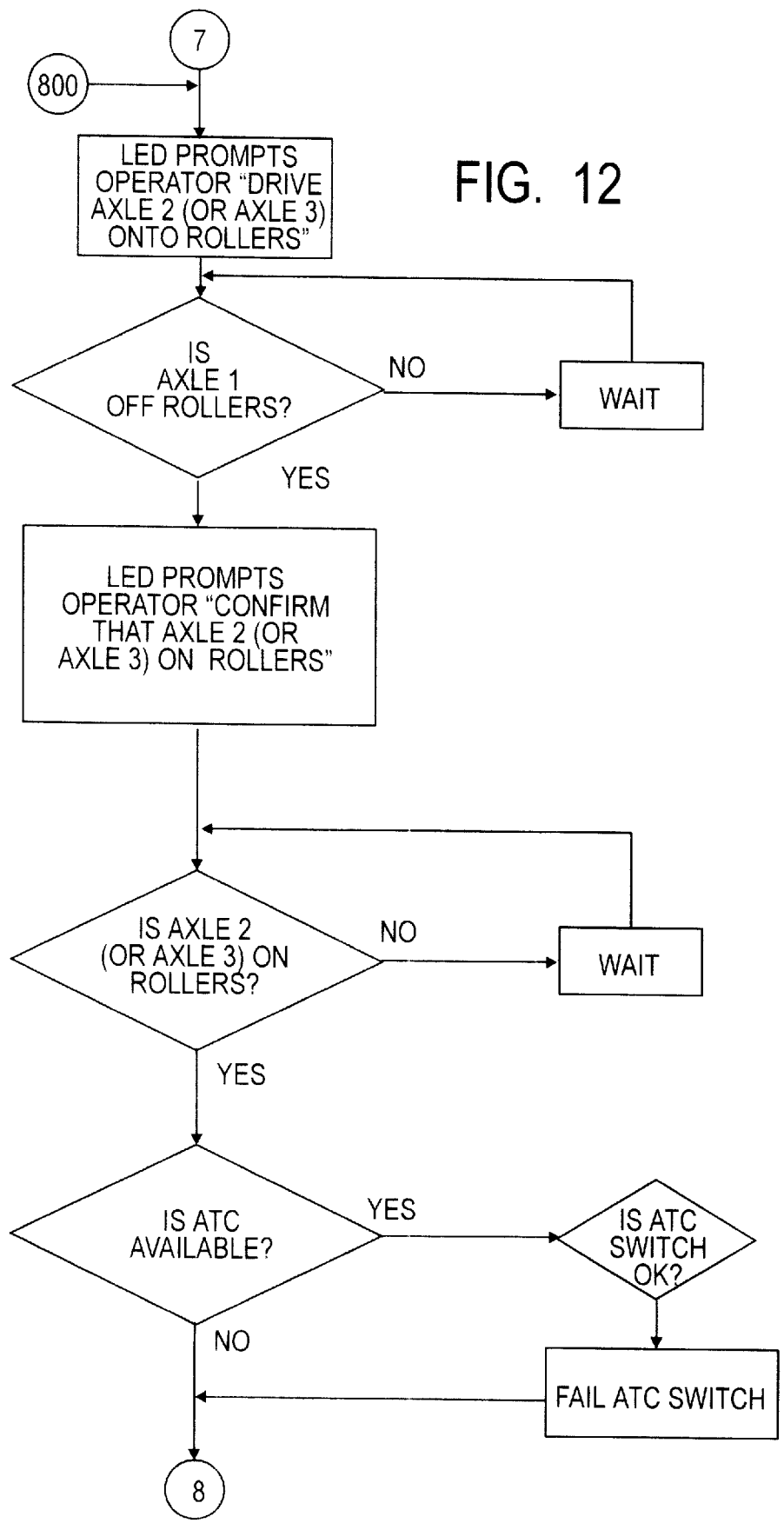
Figure 13:
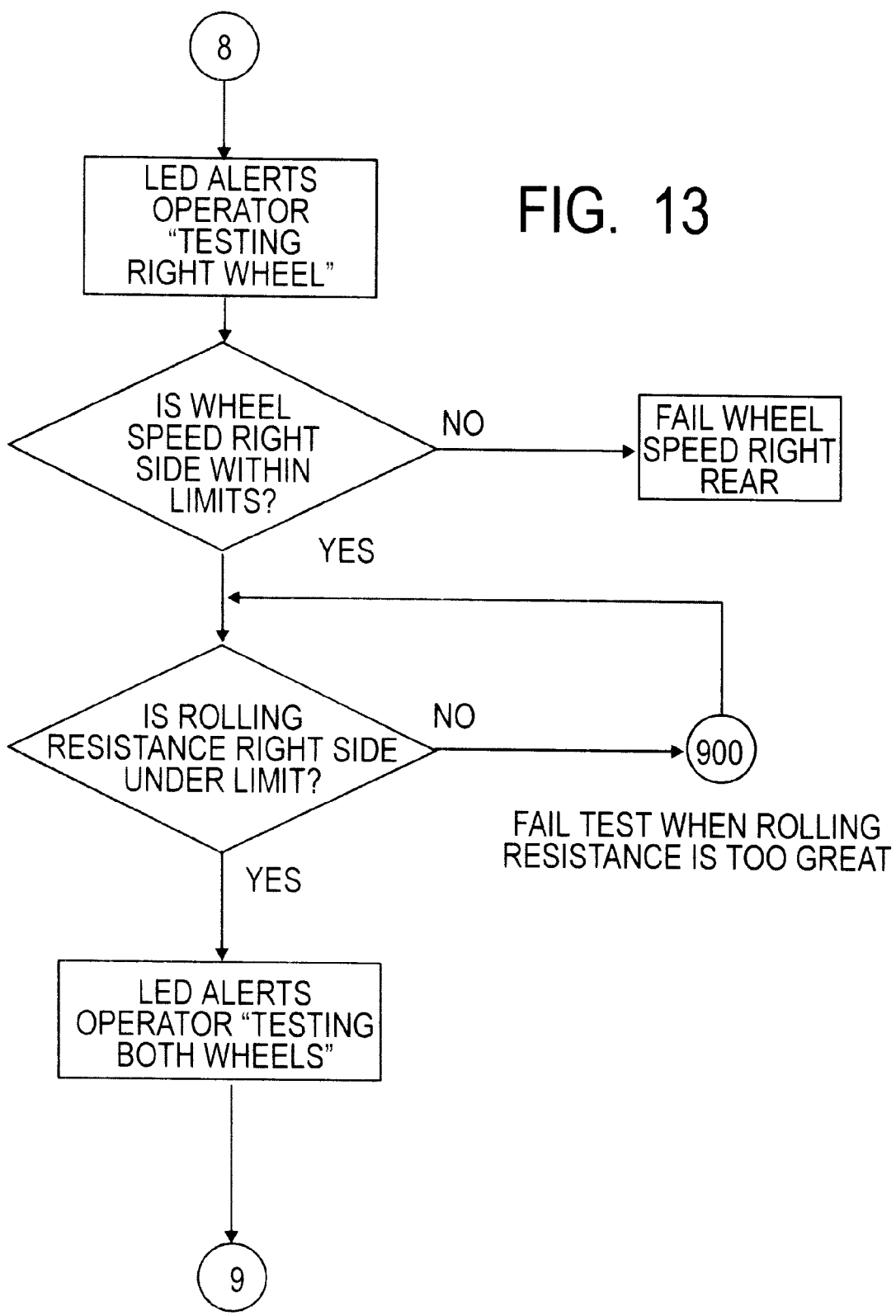
Figure 14:
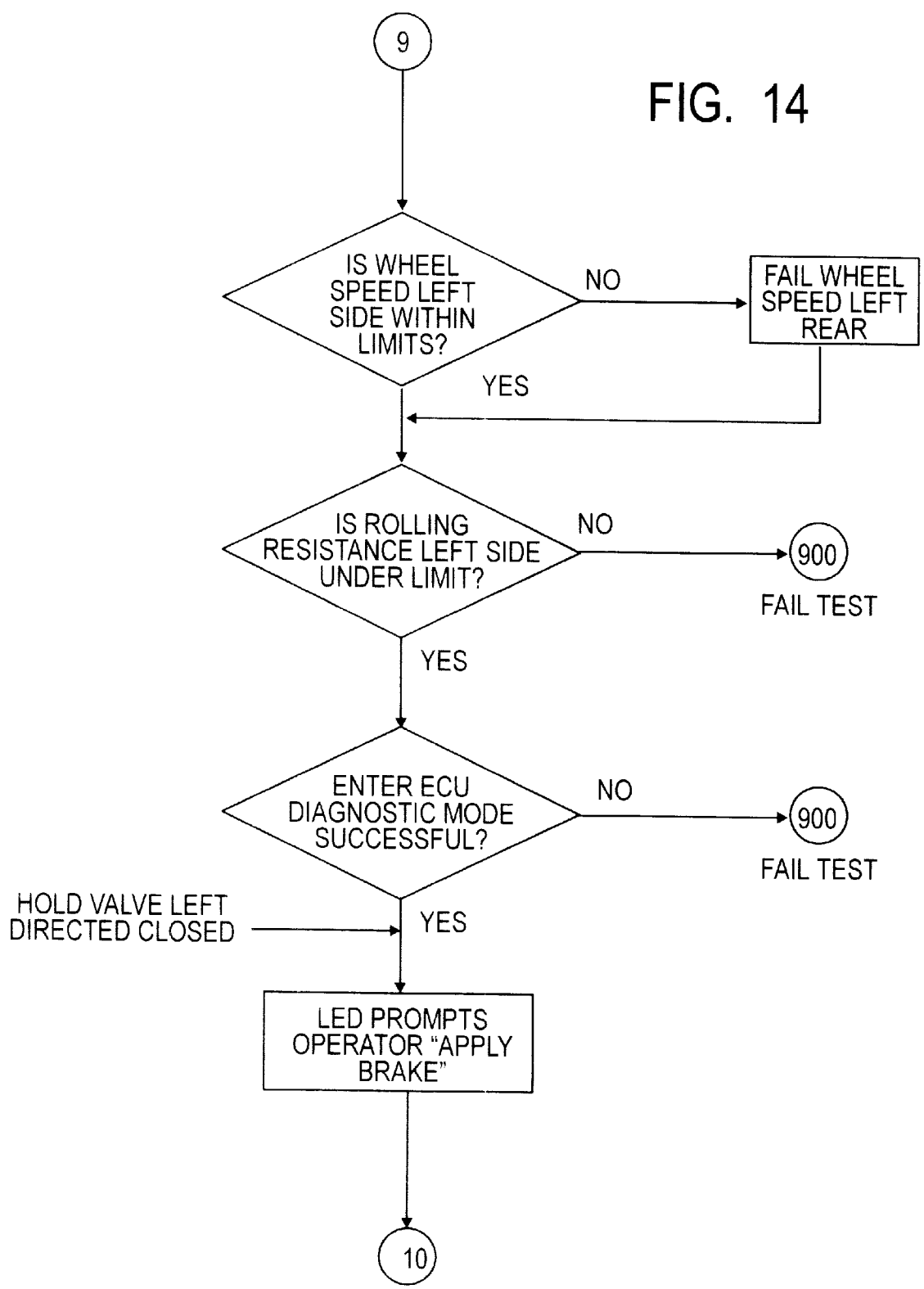
Figure 15:
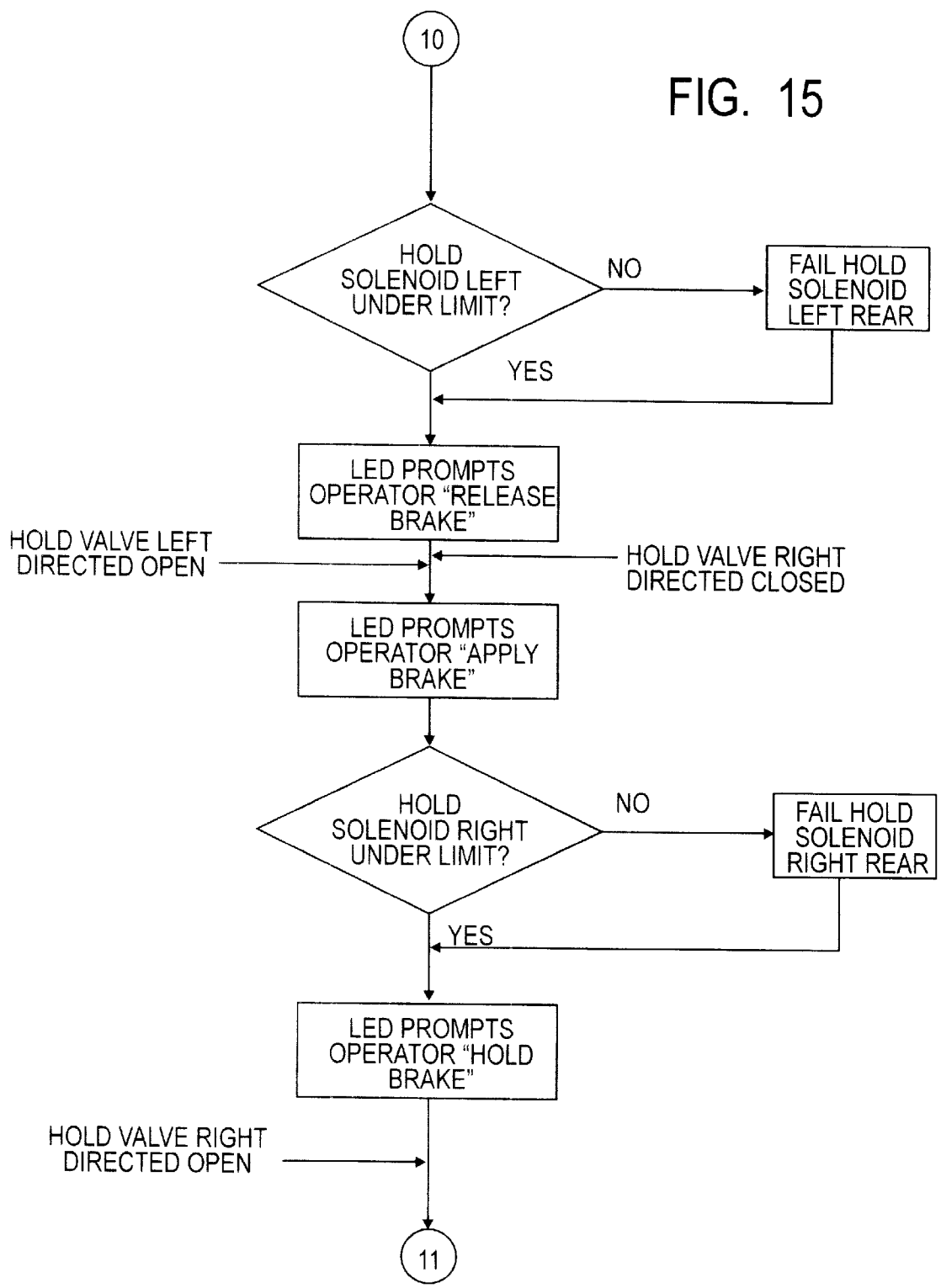
Figure 16:
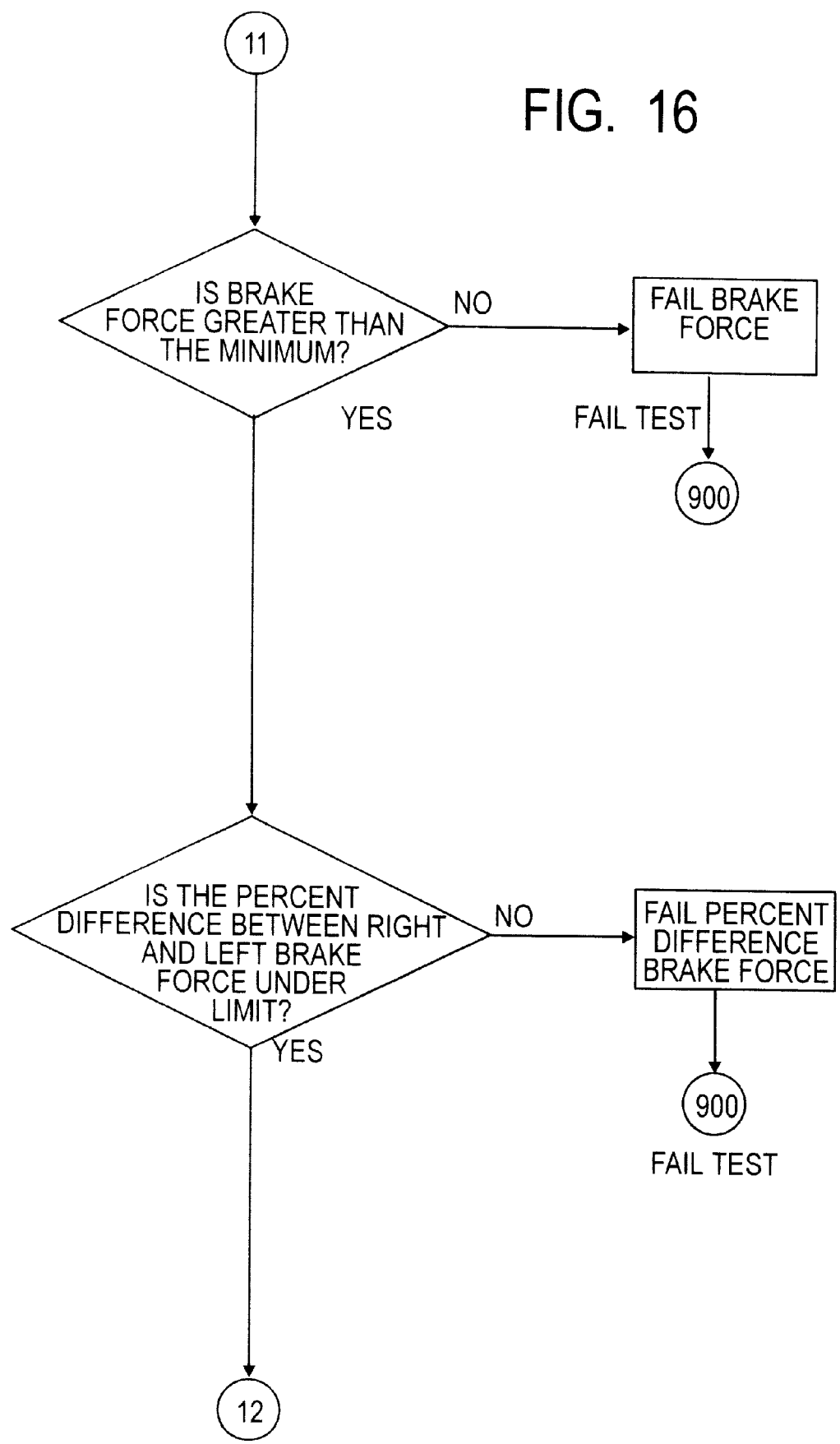
Figure 17:
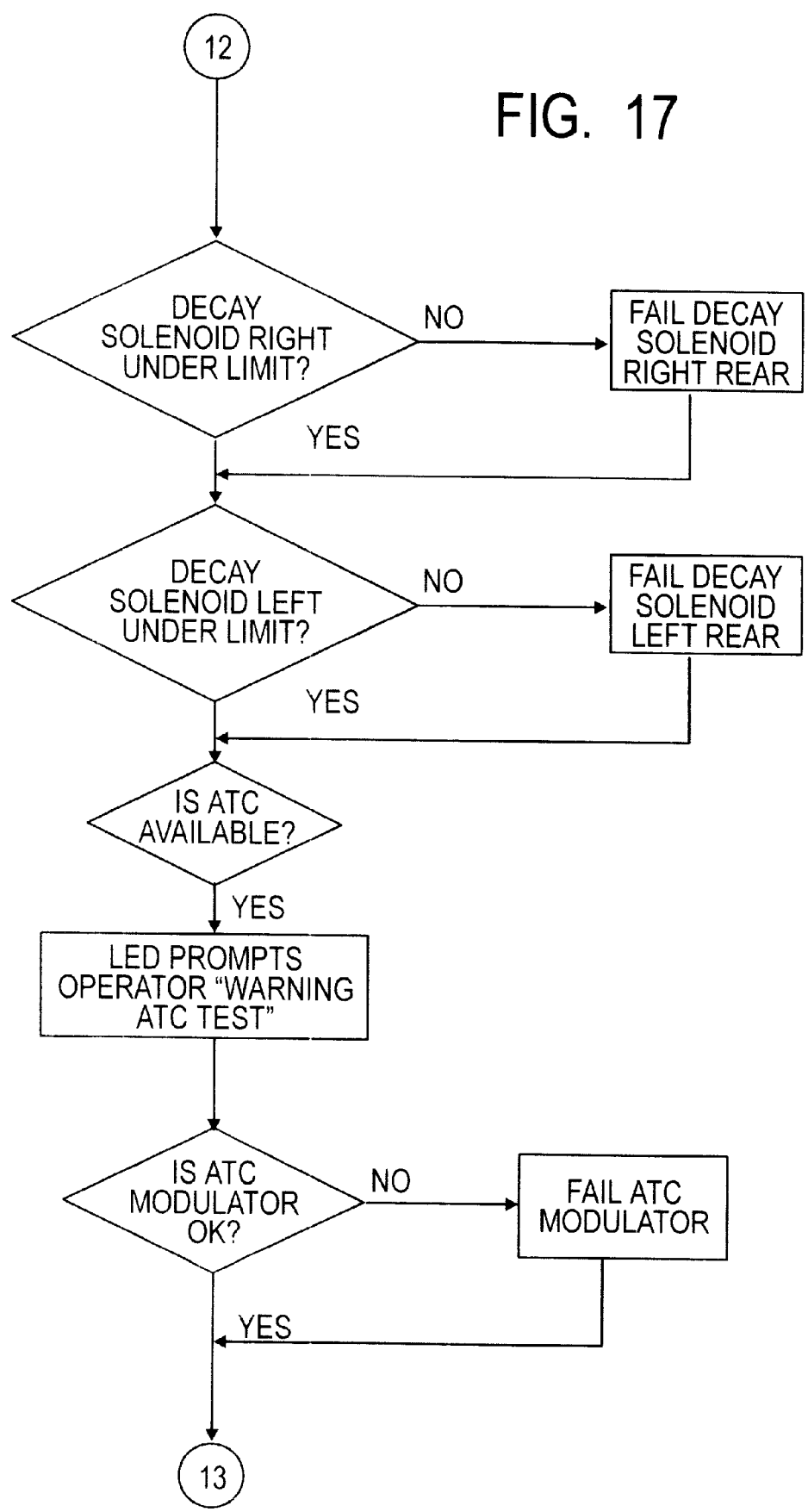
Figure 18:
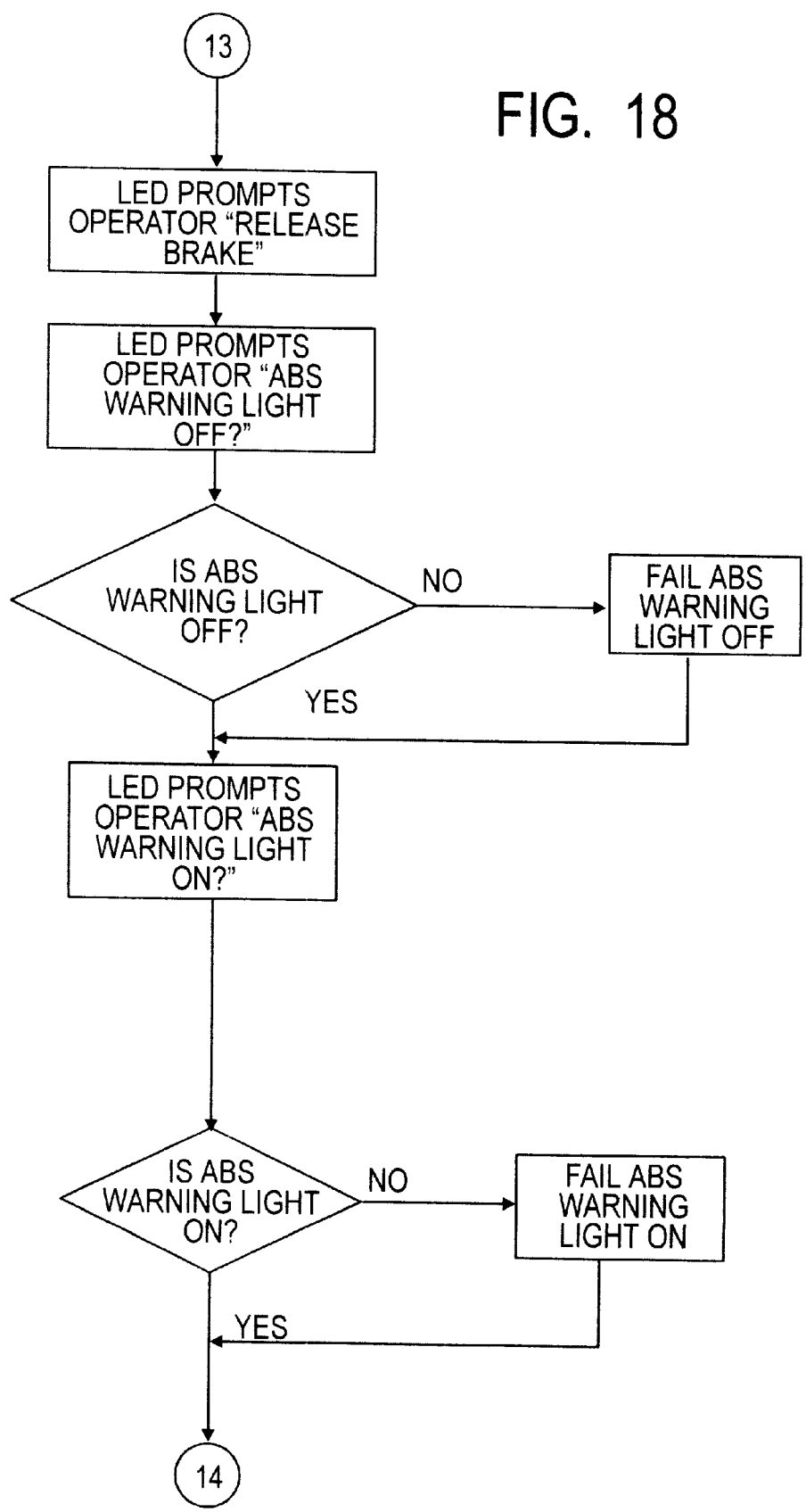
Figure 19:
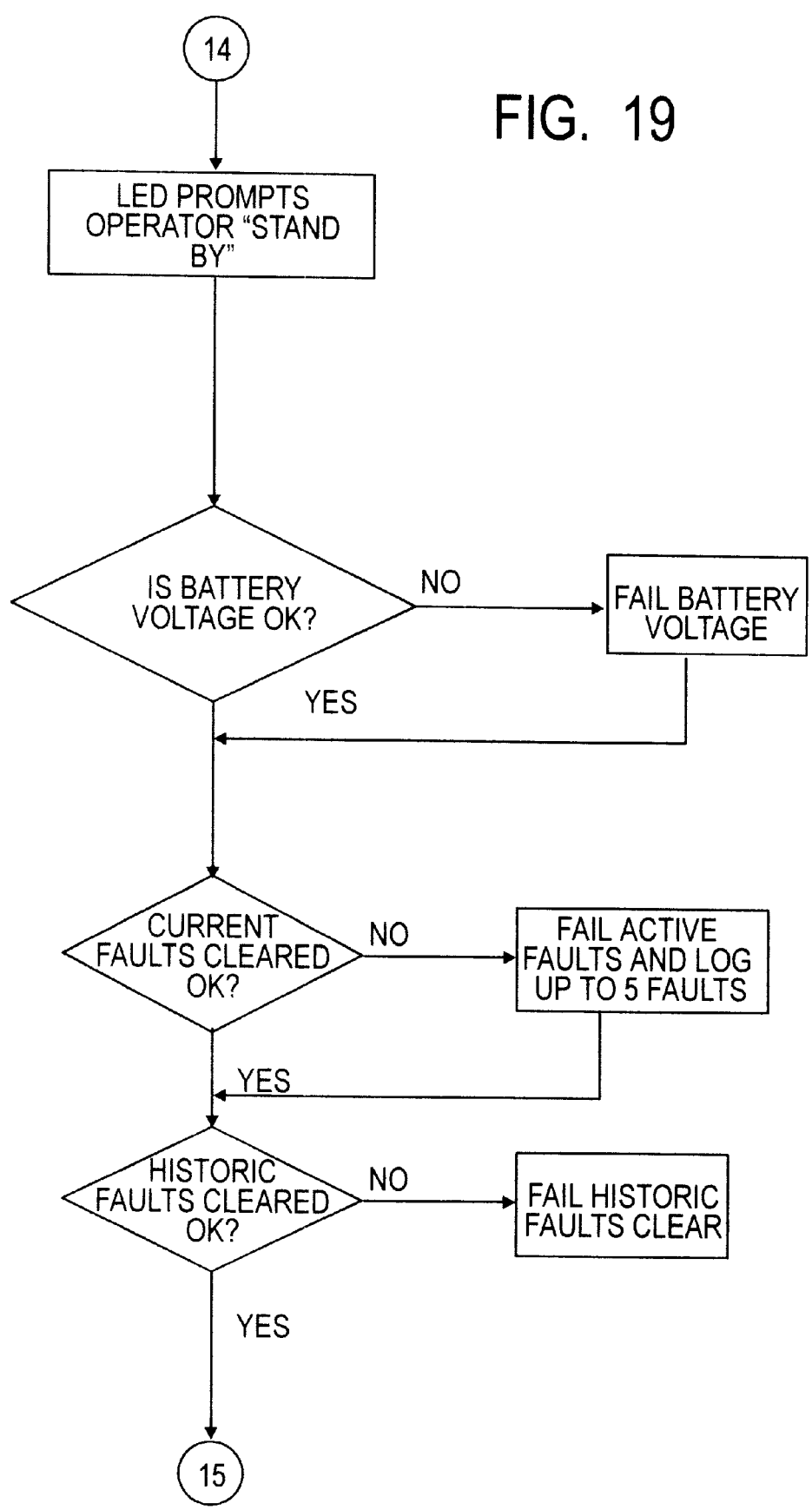
Figure 20:
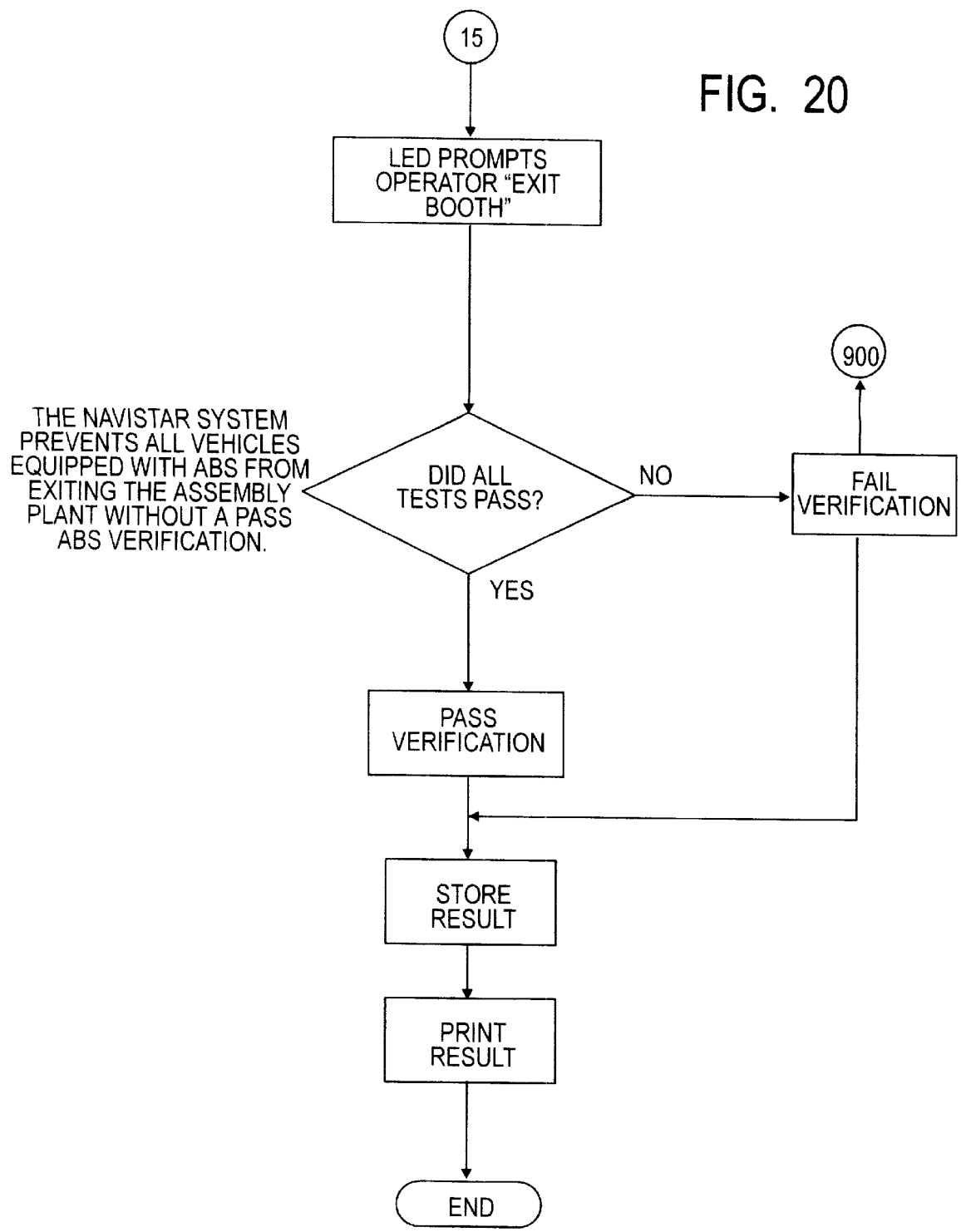

FIG. 6 is a continuation of the process shown in FIG. 5.
FIG. 7 is a continuation of the process shown in FIG. 6.
FIG. 8 is a continuation of the process shown in FIG. 7.
FIG. 9 is a continuation of the process shown in FIG. 8.
FIG. 10 is a continuation of the process shown in FIG. 9.
FIG. 11 is a continuation of the process shown in FIG. 10.
FIG. 12 is a continuation of the process shown in FIG. 11.
FIG. 13 is a continuation of the process shown in FIG. 12.
FIG. 14 is a continuation of the process shown in FIG. 13.
FIG. 15 is a continuation of the process shown in FIG. 14.
FIG. 16 is a continuation of the process shown in FIG. 15.
FIG. 17 is a continuation of the process shown in FIG. 16.
FIG. 18 is a continuation of the process shown in FIG. 17.
FIG. 19 is a continuation of the process shown in FIG. 18.
FIG. 20 is a continuation of the process shown in FIG. 19.

DETAILED DESCRIPTION

Figure 1:
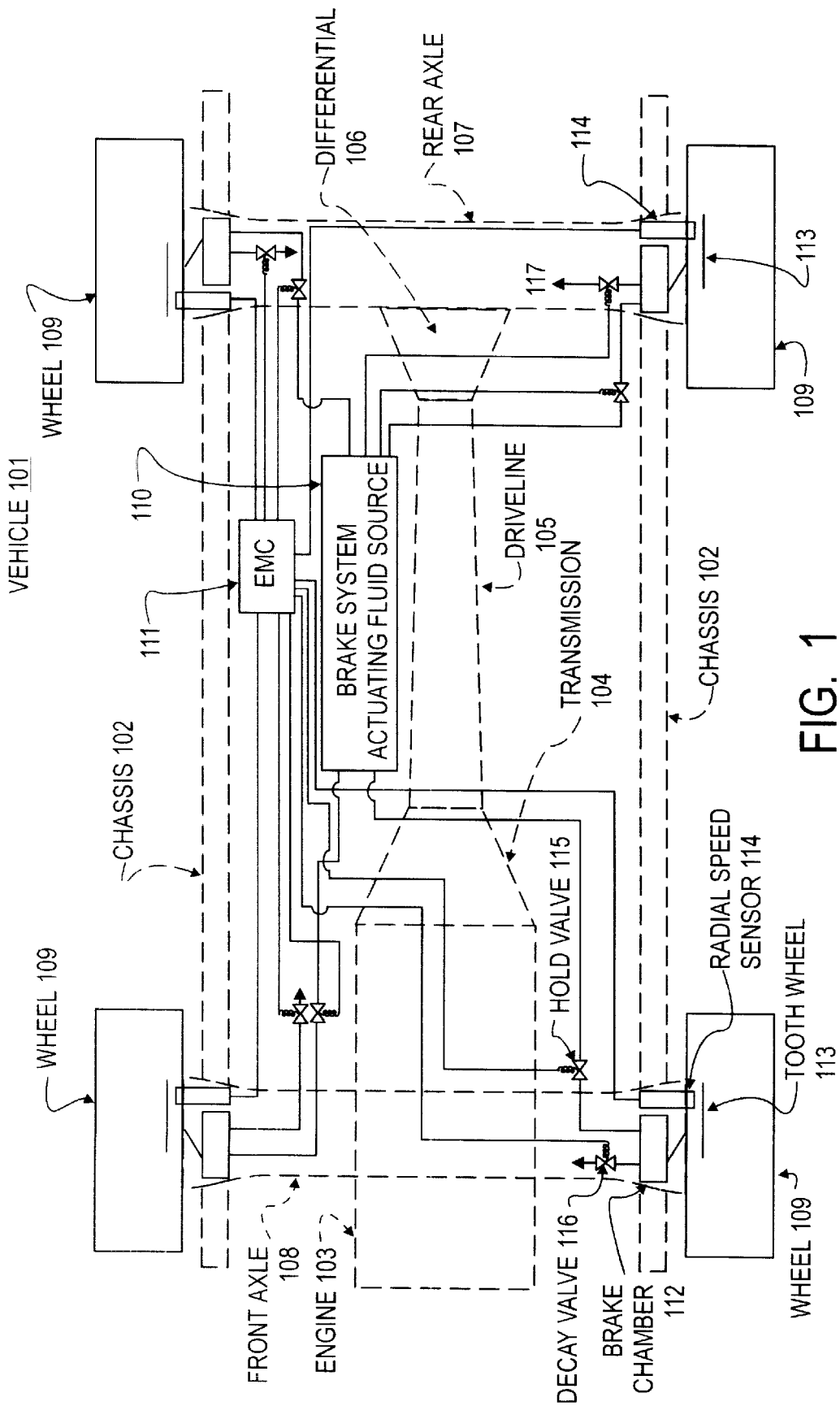
FIG. 1 is a mobile vehicle with an antilock brake system to which a process performed in accordance with this invention may tested without the vehicle undergoing an antilock braking design event.

FIG. 1 shows a mobile vehicle 101 with an antilock brake system to which the processes and testing system of FIGS. 2 to 5 may be used upon to verify assembly of the antilock brake system.

The vehicle 101 may be an automobile, a medium or heavy duty truck, or people transportation bus such as a school bus. The vehicle has a chassis 102 to which a rear axle 107 and a front axle 108 are engaged to through a suspension. An engine 103 engaged to a transmission 104 is engaged to the chassis 102. The transmission is engaged to at least the rear axle 107 through a drive-line 105 and differential 106. Each axle has at least two wheels 109, one engaged to each rotatable end of the axles. Each wheel 109 has an actuating fluid brake actuator, cylinder, or chamber 112 which when the actuating fluid, whether it be air or hydraulic fluid, is removed will apply braking force to the associated wheel 109 to cause the wheel to slow it rotational motion and eventually stop. Each brake actuator 112 has a brake system actuating fluid source or supply 110 through modulating valves. The modulating valves may be a hold valve 115 and a decay valve 116. When air is the actuating fluid, the fluid source 110 is a vehicle air tank. The hold valves 115 and the decay valves 116 may be electrical solenoid valves. Additionally, the hold valve 115 and the decay valve 116 may be the same valve or on a single manifold. For hydraulic systems, hold valves 115 and decay valves 116 may all be mounted on a single manifold, whereas in air brake systems the hold valve 115 and decay valve 116 are mounted close to the associated wheel 109. Each hold valve 115 is inline with the supply of actuating fluid such that when the hold valve 115 is closed actuating fluid is denied to the associated brake cylinder 112 thereby locking the braking force on the associated wheel 109. Each decay valve 116 is engaged to the brake cylinder 112 or supply of actuating fluid such that actuation or opening of the decay valve will cause actuating fluid to be bled off of the associated brake cylinder 112 thereby removing braking force from the associated wheel 109. The vehicle has an antilock brake electronic control module (ECM) 111 electrically engaged and for controlling the hold valves 115 and the decay valves 116. The control over these valves allows the antilock brake ECM 111 to adjust braking force on the individual wheels to remove a detected wheel lockup condition. Radial speed sensors 114 in general provide wheel lockup and wheel speed information. Each wheel 109 has a radial speed sensor 114 that is electrically engaged to the antilock brake ECM 111. The radial speed sensor 114 may monitor a tooth wheel 113 engaged to the associated wheel 109. Installation of the radial speed sensors 114 is important for antilock brake system operation and performance. Incorrect installation may result in inaccurate radial speed indications for the individual wheels 109.

Figure 2:
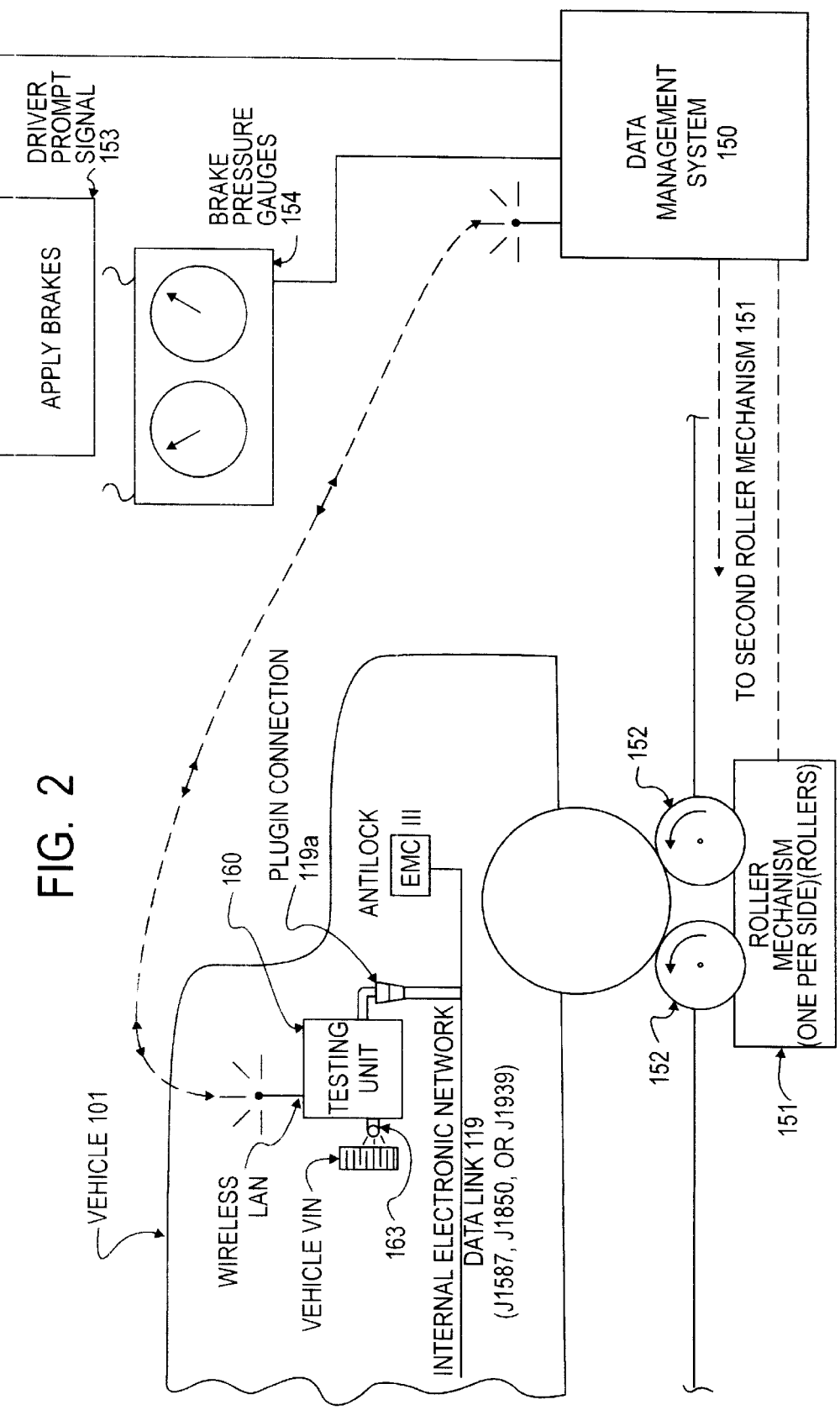
FIG. 2 is a system for performing an antilock brake system assembly verification made in accordance with this invention.
Figure 3:
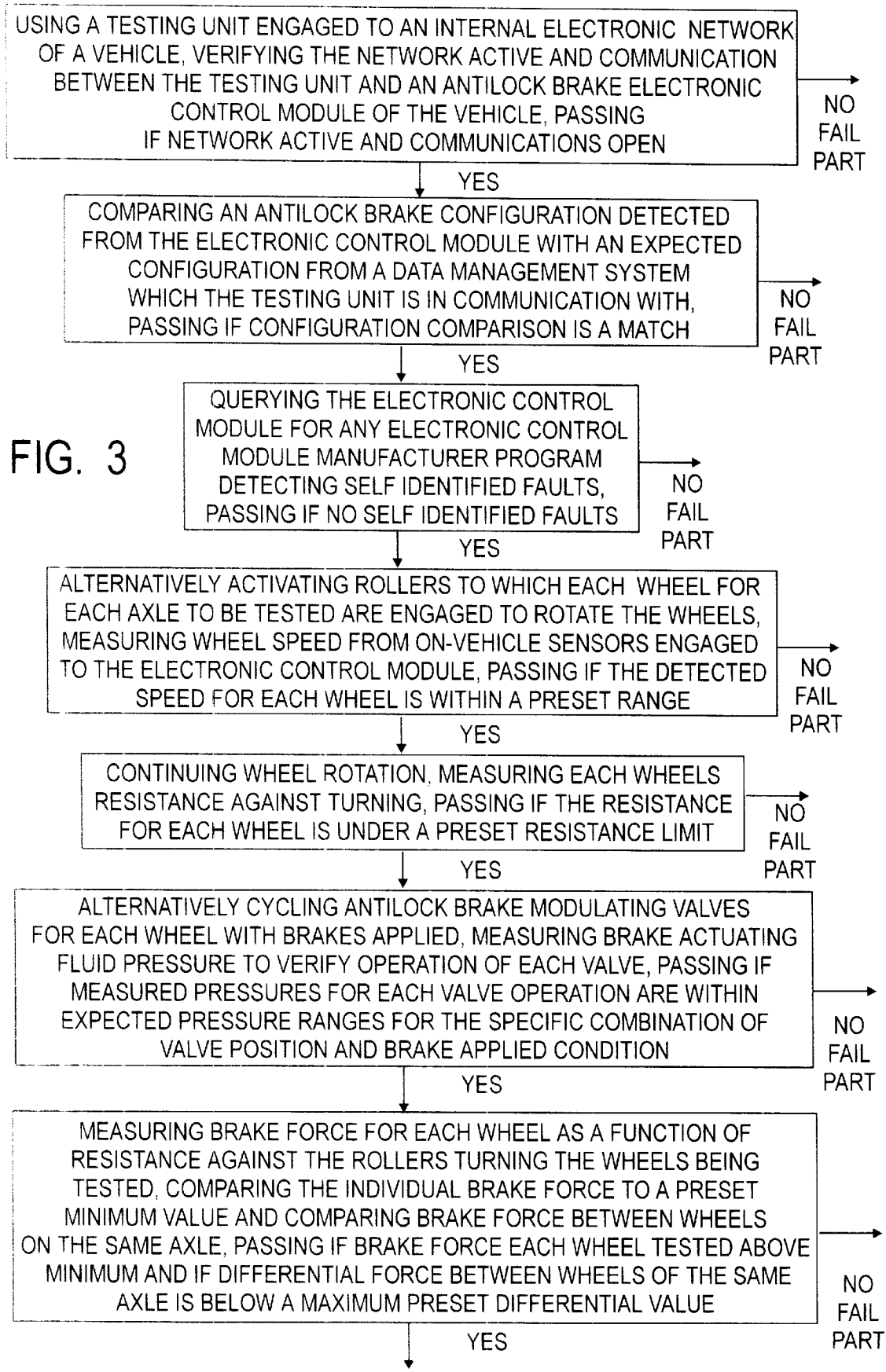
FIG. 3 is a process of verifying antilock brake system assembly in a mobile vehicle in accordance with this invention.

The vehicle 101 has an internal electronic network data link 119, shown in FIG. 2. The antilock brake ECM 111 is engaged to communicate along the data link 119. The data link 119 may operate under the Society of Automotive Engineers (SAE) communication protocols J1587, J1850, or J1939 or any allowable combination or subsequent revision of these protocols by the SAE. Electronic control modules for other vehicle components such as the engine 103 and transmission 104 may also communicate with and be in electrical engagement with the data link 119. The data link 119 may have a plug-in connection 119a to which electrical devices that may communicate under the communication protocols may be engaged.

A system for verifying assembly of an antilock brake system made in accordance with this invention may be used as a vehicle end-of-assembly-line final check for antilock brake systems or as a post maintenance assembly check for a brake repair facility. The main assumption for such a system made in accordance with this invention is that the manufacturer of the antilock brake ECM 111 has properly programmed the antilock brake ECM 111 for the design antilock braking event. Under that assumption, the system and process that it controls for verifying antilock brake system need only verify proper connections and communications between components. In the prior art, vehicles had to be accelerated to higher speeds on the order of 20 to 35 miles per hour with a design antilock brake event induced. The system and process of this invention only need have the vehicle wheels 109 rolled on the order of 3 to 6 miles per hour. Unlike the prior art, extensive safety precautions for testing an accelerated and subsequently decelerated vehicle indoors are not required. Additionally, the assembly or maintenance facility does not need to be concerned with removal excessive exhaust fumes generated indoors by the higher speed tested vehicles of the prior art.

A system for verifying assembly of an antilock brake system made in accordance with this invention is shown in FIG. 2. The system includes a testing unit 160 that is electrically engageable to the internal electronic network data link 119 of the vehicle 101. The testing unit 160 shown in FIG. 2 is a portable version although testing units 160 for this invention may fixed so long as they may communicate with the antilock brake ECM 111. The testing unit 160 is shown electrically engaged to the data link 119 through the plug-in connection 119a of the data link 119 on the vehicle 101. The antilock brake assembly verification system also includes a data management system 150 that may be a main frame computer although any computing system with sufficient capacity will be acceptable. In a small brake maintenance facility the testing unit 119 and the data management system 150 may be the same processor. The data management system 150 will contain a data base of the expected configurations the vehicles that will have their antilock brake system assemblies verified. The portable testing unit 160 shown in FIG. 2 has a wireless communication unit 162 that allows communication between the testing unit 160 and the data management system 150. This wireless communication may be by radio waves. If the testing unit 160 is a fixed embodiment, the communication would be hard wired to the data management system 150. The data management system 150 is engaged to control a pair of roller mechanisms 151 or as will be referred to as rollers 151. The rollers 151 are spaced to allow vehicles 101 of various axle lengths and wheel dimensions to be driven or moved onto so that a wheel on either side of the axle to be tested is in contact with the turn cylinders 152 of the roller 151. The rollers 151 will rotate the wheels 109 together or independently per the instructions from the data management system 150. The rollers 151 contain resistance to turning measuring devices that provide a resistance or counter torque force against turning back to the data management system. When the brakes of the vehicle 101 are not applied, the resistance to turning measurements are indications of the bearings of the wheels 109 and brake tightness and other components on the axle for enabling free wheeling. When the brakes of the vehicle are applied, the resistance to turning measurements indicate braking strength. Comparison of the resistance to turning measurements between the wheels 109 with the brakes applied will indicate imbalances between the braking ability at each wheel 109. The data management system 150 is also engaged to a driver prompt sign 153. This driver prompt sign 153 is in a prevalent location to a driver of the vehicle with an axle engaged on the rollers 151. The driver prompt sign, provides instructions to the driver such as when to apply the brakes of the vehicle 101 through the brake pedal. The driver prompt sign 153 also contains queries to the driver such as to identify which axle is being tested, and to what indicators are lit in a cab of the vehicle 101. Sample instructions and queries displayed on the driver prompt sign 153 are discussed below in the description of the process. The data management system 150 is also engaged to a set of brake system pressure gauges 154 that in some cases may be integral to the driver prompt sign 153. The process involves measurements of antilock brake system actuating fluid pressures from the antilock brake ECM 111. The pressure gauges 154 which are also visible to a driver of the vehicle from the cab of the vehicle 101 during the test provide the driver with some indications of what the system is detecting as to status of the antilock brake system being tested.

Figure 4:
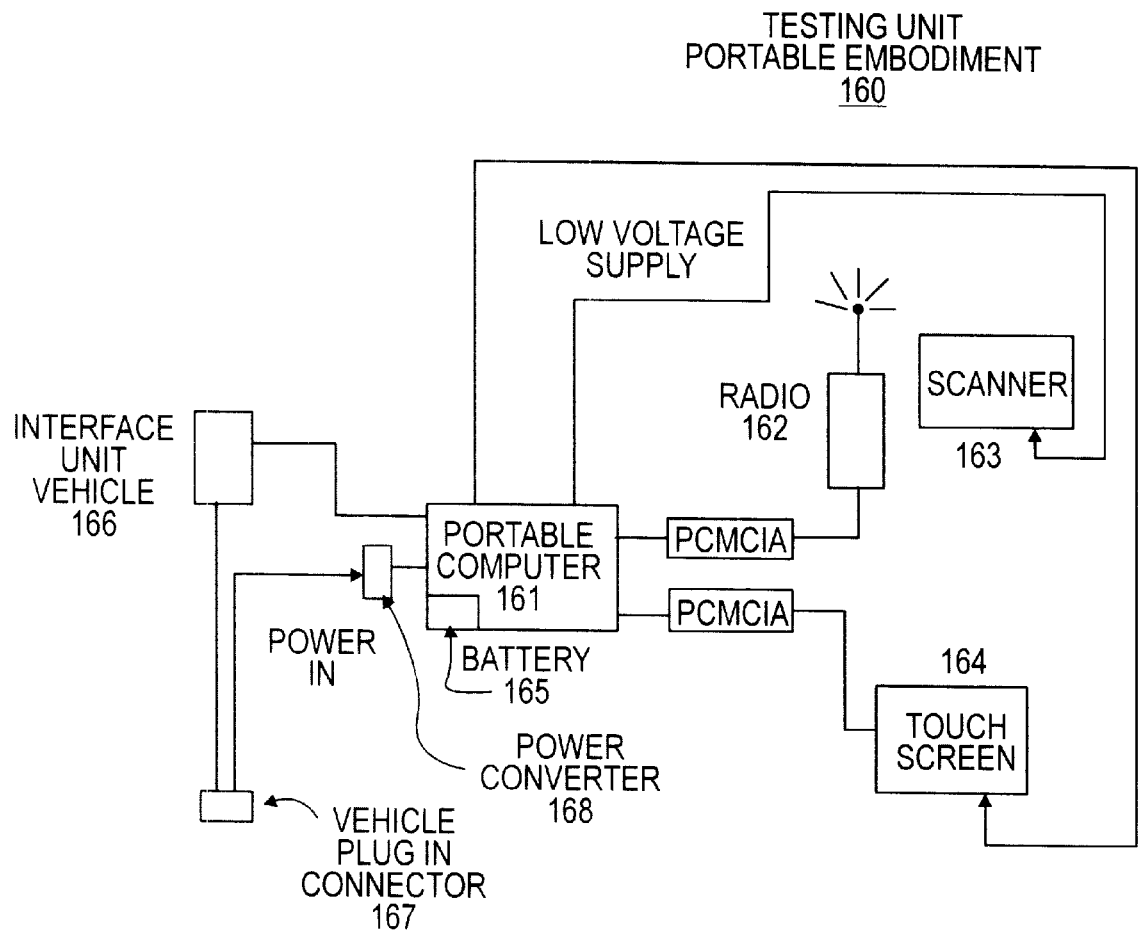
FIG. 4 is a portable embodiment of a testing unit used for verifying assembly of an antilock brake system for a mobile vehicle.

The testing unit 160 shown in FIG. 4 is a portable embodiment. It contains a portable computer (PC) 161 that is preferably at a minimum a pentium processor as far as processing speed. The PC 161 may be engaged to a vehicle plug-in connector 167 for engagement to the vehicle plugin connector 119a and communication with the internal electronic network data link 119. Communication is accomplished through an interface unit 166 engaged to the PC 161. The power for the PC 161 is from an internal battery 165 for stand-alone use. When engaged to a vehicle the plug-in connector 167 allows for power flow to power the PC 161 and charge the battery 165 from the vehicle 101 electric system. There may be a power converter 168 to change the normally 12 volt vehicle power to a voltage appropriate for the PC 161. The PC 161 may be engaged to communicate with a scanner 163. The scanner 163 is capable of reading the vehicle identification number or VIN of the vehicle 101 to identify the vehicle 101 to be tested. The scanner 163 may be a bar code scanner for vehicles that have their VIN displayed in bar code form. The scanner 163 may be powered from a low voltage power source from the PC 161 as shown in the Figure. The PC 161 may be engaged to a touch screen controller 164 through a PCMCIA card. The driver of the vehicle may answer prompts from the driver prompt sign 153 on the touch screen 164. The touch screen may also be powered from a low voltage power source such as the PC 161 as shown. Where the PC 161 is not hard wired to the data management system 150, as in the case shown, the PC 161 will be engaged to a wireless communication device 162 such as the radio shown FIG. 4, through a PCMCIA card. The wireless communication device 162 may also be a microwave transceiver. The testing unit 160 may be programmed with the antilock brake system assembly verification application. This may be written as a 32 bit programming application. The testing unit 160 may be used for other vehicle testing applications beyond the described antilock brake verification, depending on the programming. Two such examples are briefly described as the queries and communications with electronic control modules for the engine 103 and the transmission 104. One embodiment of the portable testing unit embodiment 160 has been made with a Toshiba Libretto 7OCT as the PC 161, touch screen 164 from ELO, and a radio and LAN adapter 162 from Aironet.

It should also be noted that the data management system 150 may be the lead processor for the process communicating to the vehicle 101 through the testing unit 160.

A basic process performed to verify the assembly of an antilock brake system in accordance with this invention includes the following steps. The testing unit 160 is engaged to the internal electronic network 119 of the vehicle 101. The testing unit 160 verifies that the internal electronic network 119 is electrically active and that there is communication with the antilock brake ECM 111. This portion of the test is considered failed if either the network is not active or if there is no communication with the antilock brake ECM 111. The testing unit 160 queries the antilock brake ECM as to the specific vehicle antilock brake system configuration and compares that configuration with one received from the data management system 150. The configuration check is passed if there is a match and is failed if there is no match. The ECM 111 may be directed to recheck configuration if there is no match initially, and may be later passed if such a re-check then results in a match with the data management system 150 expected configuration. The testing unit 160 queries the antilock brake ECM 111 if the ECM 111 has any self identified faults to which the specific ECM 111 manufacturer has programmed the ECM 111 to identify and flag. The ECM self identified check is passed if no faults are identified, and failed if a fault is identified. The testing unit through the data management system or the data management system leading will direct alternatively direct the rollers 151 to roll each wheel 109 for the axle to be tested, measuring wheel speed from the vehicle's radial wheel speed sensors 114. If the speed is within a preset range, the free wheeling speed check is passed, otherwise it is considered failed. Concurrently to, or before, or after the radial speed free wheeling check, the resistance to turning each wheel is measured by the rollers with the rollers turning and the brakes not applied and reported back to the testing unit 160 or data management system 150. These checks verify that vehicle 101 components that allow the wheels 109 to free wheel are operational and that the brakes were not installed too tight as to allow free wheeling. The driver of the vehicle 101 is prompted or directed to apply the brakes of the vehicle. The testing unit 160 directs the antilock brake ECM 111 to alternatively cycle the brake modulating valves for each wheel with the brakes applied, measuring brake actuating fluid pressure to verify operation and correct installation of each valve. For the vehicle shown in FIG. 1, the modulating valves comprise a hold valve 115 and a decay valve 116, although other configurations exist. In the case of the hold valves 115 of the FIG. 1 embodiment, closure of the hold valve for the wheel should result in actuating pressure downstream of the hold valve staying the same. The hold valve check is passed if the pressure stays at the previous pressure within a preset tolerance and passed if the pressure is out of the preset tolerance range from the previous pressure. In the embodiment of the test as described, the individual hold valve is closed, and then driver is directed to apply the brakes, the initial downstream pressure being zero, the pressure should stay near or at zero. Where the modulating valves include decay valves 116, the actuating or opening of the decay valves should result pressure upstream of the decay valves decreasing to below a preset value. The decay valve check is passed if the pressure decreases to below the decay valve preset value and failed if the pressure is at or above the decay valve check preset value.

The basic process may be programmed into a computer or a testing unit 160 or the program may be a computer program product comprised of a computer usable medium having computer readable program code means embodied in the medium for affecting the above process when used in conjunction with a testing unit 160.

Additional steps may include the step of measuring resistance to turning the wheels, with the rollers 151 attempting to roll the wheels with the driver applying the brakes. This step will indicate the braking force of the brakes for each wheel 109. The brake force check will be passed if brake for force for a wheel is above a preset brake force minimum and failed if insufficient force. An additional test includes comparing the brake force between the wheels at opposite ends of an axle. The brake force differential test is passed if the difference is below a maximum preset force differential value and failed if above or at the maximum preset differential value.

Additional steps, as shown in FIG. 5 may include the following. As medium and heavy duty trucks may have engine brakes that utilize back-pressure of engine exhaust gases to slow the engine 103 and hence provide braking to the vehicle 101, these engine brakes would need to be disabled unless they are a component of the antilock brake system. The additional step would be to query the vehicle or a lead electronic control module (lead ECM) on the vehicle to determine if the vehicle has an engine brake. If the response is that is there is an engine brake, then the testing unit 160 directs the component controlling the engine brake to disable the engine brake. If the engine brake will not disable, the check is failed, otherwise it is passed. An additional step may be for the testing unit 160 to query as to the ECM 111, or ECU for Electronic Control Unit as shown in FIG. 5, as to the ECU part number and ECU serial number. The testing unit will compare the ECU 111 manufacturers correct firmware or internal programming code to be the expected code as received from the data management system 150. The ECU firmware check will be failed if the firmware is incorrect.

The verification of assembly described above only verified antilock brake assembly for one axle of the vehicle. As mentioned above, the are at a minimum two axles on the vehicle 101 and there well could be more. The test described above would be additionally performed on the additional axles. The vehicle 101 would be initially moved or driven onto the rollers 151, the driver would be queried through the driver prompt sign 153 or the PC 161 as to which axle is being tested on the touch screen 164 or the PC 161 directly The above tests on the applicable axle, wheels 109, brakes, and modulating valves and then the vehicle would be moved to place a different axle to be tested on the rollers 151 at the direction from the testing unit 160 once again through the prompt sign 153 or the PC 161. The system would query as to which axle is being tested. If the verification system is checking a drive axle such as the rear axle 107 shown in FIG. 1, the system would query as to whether the vehicle 101 has an automatic traction control (ATC) system. If the answer is yes than the testing unit 160 queries the ATC is inactive. If the ATC system will not go inactive, then the ATC check is failed. Additional steps may verify the ATC system for self detected faults. These steps may include notifying the driver that ATC will be checked, querying the ATC Modulator as to any faults self detected by the ATC modulator. If faults exist the ATC modulator check is failed, otherwise it is passed. Following the checks of both axles, the prompt sign 153 or the PC 161 may direct the driver to release the brakes of the vehicle 101 by removing his foot from the brake pedal. The antilock brake assembly verification system may query the driver if an 'ABS warning light (is) off?' in the cab of the vehicle 101. If the answer back is 'No' the antilock brake system warning light off test is failed, otherwise it is passed. The testing unit 160 may then direct the antilock brake ECM 111 to energize the ABS warning light in the cab. The driver would then be queried as to whether the 'ABS warning light (is) on ?'. The warning light on check is passed if the driver acknowledges 'Yes' that the light is on, other wise the warning light on check is failed. An additional test may be that the testing unit 160 may query the antilock brake ECM 111 as to what battery voltage is for the vehicle electrical system. If the voltage is within a preset voltage range the battery check is passed, otherwise the test is failed. An additional step may be the testing unit querying the antilock ECM 111 as to whether current faults are cleared. If current faults are not cleared, the antilock ECM 111 is directed to clear the current faults. The system directs the driver to move the vehicle away from the testing assembly, stores the results, and prints the results if desired.

A further step may include querying the engine electronic control module as to the status of the link of the electronic control module of the engine 103 to the internal electronic network 119. If the link to the network is acceptable the engine link test is passed, otherwise the test fails. A similar check can be run with the electronic control module of the transmission 104.

As described above, the antilock brake system assembly verification system, the process for verifying assembly, and the testing unit for verifying provide a number of advantages, some of which have been described above and others of which are inherent in the invention. Also modifications may be proposed to the antilock brake system assembly verification system, the process for verifying assembly, and the testing unit without departing from the teachings herein.

I claim:

1. A process for testing an antilock brake system for a mobile vehicle, the vehicle having at least two axles with at least two wheels per axle, each wheel on an opposite end of the axle, each wheel having an actuating fluid brake cylinder which when actuating fluid is applied will apply braking force to the associated wheel, each brake cylinder having a supply of actuating fluid through a hold valve and a decay valve, each hold valve being inline with the supply of actuating fluid such that when the hold valve is closed actuating fluid is denied to the associated brake cylinder thereby preventing braking force on the associated wheel, each decay valve being engaged to the brake cylinder such that actuation of the decay valve will cause actuating fluid to be bled off of the associated brake cylinder thereby removing braking force on the associated wheel, an antilock brake electronic control module for controlling operation of the hold valves and decay valves, each wheel having a radial speed sensor for detecting radial speed of the wheels, each radial speed sensor providing a wheel speed signal to the antilock brake electronic control module, the antilock brake electronic control module capable of detecting wheel lock up from the radial speed sensors and capable of adjusting braking force on the associated wheel to remove a detected wheel lockup condition, and the vehicle having an internal electronic network to which the antilock brake electronic control module is engaged, comprising the steps of:

engaging a testing unit to the internal electronic network of the vehicle;

verifying that the internal electronic network is electrically active, passing the network active test if active, and failing the network active test if not active;

verifying communication through between the testing unit and the antilock brake electronic module, passing the communication test if open communication is found, and failing the communication test if no communication between the testing unit and the antilock brake electronic module;

identifying the vehicle by vehicle identification number using a bar code reader engaged to the testing unit;

querying a data management system engaged to the testing unit as to an expected antilock brake configuration for the vehicle;

querying the antilock brake electronic control module for system configuration;

comparing the system configuration from the antilock brake electronic control module with the expected antilock brake configuration for a match, passing the antilock brake configuration test if the actual matches the expected, and failing the configuration test if the actual does not match the expected;

querying the antilock brake electronic control module for any electronic control module firmware self identified faults, passing if no firmware self identified faults, and failing if there are firmware self identified faults;

querying a driver of the vehicle to verify which axle of the vehicle is aligned to a pair of independent rollers with one wheel on each roller to identify the axle to be tested;

activating one of the rollers to roll a first rotated wheel of the axle to be tested;

measuring wheel speed for the rotated wheel through the radial speed sensor for the first rotated wheel and communicated to the testing unit through the antilock brake electronic control module, passing the first wheel speed test if wheel speed within a preset wheel speed range, and failing the first wheel speed test if not within the preset wheel speed range;

measuring rolling resistance of the first rolled wheel through the roller for that wheel, passing the first wheel rolling resistance test if under a preset rolling resistance range, and failing the first wheel rolling resistance test if rolling resistance is at or above the preset rolling resistance range;

activating a second roller of the rollers to roll a second wheel of the axle to be tested;

measuring wheel speed for the rotated wheel through the radial speed sensor for the second rotated wheel and communicated to the testing unit through the antilock brake electronic control module, passing the second wheel speed test if wheel speed within the preset wheel speed range, and failing the second wheel speed test if not within the preset wheel speed range;

measuring rolling resistance of the second rolled wheel through the roller for that wheel, passing the second wheel rolling resistance test if under a preset rolling resistance range, and failing the second wheel rolling resistance test if rolling resistance is at or above the preset rolling resistance range;

directing the closure of the hold valve for the second wheel of the axle to be tested;

directing the driver of the vehicle to apply the brakes of the vehicle and measuring actuating pressure downstream of the first wheel hold solenoid, passing the second wheel hold valve test if actuating fluid pressure is within a preset pressure range around the last value, and failing the second wheel hold valve test if actuating fluid pressure is out of the preset pressure range;

directing the driver to release the brakes of the vehicle;

directing the opening of the second wheel hold valve;

directing the closure of the first wheel hold valve for the first wheel of the axle to be tested;

directing the driver to apply the brakes of the vehicle and measuring actuating fluid pressure downstream of the first wheel hold solenoid, passing the first wheel hold valve test if actuating fluid pressure is within a preset pressure range around the last value, and failing the first wheel hold valve test if actuating fluid pressure is out of the preset pressure range;

directing the opening of the first wheel hold valve;

measuring individual wheel brake force applied using the rollers for each wheel to measure resistance force;

comparing the measured first wheel brake force to a preset minimum brake force limit, passing the first wheel brake force test if the measured first wheel brake force is greater than the preset minimum brake force limit, and failing the first wheel brake force test if the measured first wheel brake force is less than or equal to the preset minimum brake force limit;

comparing the measured second wheel brake force to a preset minimum brake force limit, passing the second wheel brake force test if the measured second wheel brake force is greater than the preset minimum brake force limit, and failing the second wheel brake force test if the measured second wheel brake force is less than or equal to the preset minimum brake force limit;

comparing the measured first wheel brake force with the measure second wheel brake force to determine a differential brake force from the first wheel to the second wheel, passing the brake force wheel differential test if the differential is under a preset brake force differential limit, and failing the brake force wheel differential test if the differential is at or above the preset brake force differential limit;

directing the opening of the second wheel decay valve for the second wheel of the axle to be tested and measuring actuating fluid pressure for the actuating fluid cylinder for the second wheel, passing the second wheel decay valve test if actuating fluid pressure is below a preset decay valve pressure limit, and failing the second wheel decay valve test if actuating fluid pressure is at or above the preset decay valve pressure limit;

directing closure of the second wheel decay valve;

directing the opening of the first wheel decay valve for the first wheel of the axle to be tested and measuring actuating fluid pressure for the actuating fluid cylinder for the first wheel, passing the first wheel decay valve test if actuating fluid pressure is below a preset decay valve pressure limit, and failing the first wheel decay valve test if actuating fluid pressure is at or above the preset decay valve pressure limit;

directing closure of the first wheel decay valve;

directing the driver to release the brakes of the vehicle;

storing results of tests; and dis-engaging the testing unit from the internal electronic network of the vehicle.

2. The process of claim 1, further comprising the step of:

querying an engine electronic control module of the vehicle as to the status of a communication link between the engine electronic control module and the internal electronic network of the vehicle, passing the engine link test if the engine communication link is active, and failing the engine link test if the engine communication link is not active.

3. The process of claim 1, further comprising the step of:

querying a transmission electronic control module of the vehicle as to the status of a communication link between the transmission electronic control module and the internal electronic network of the vehicle, passing the transmission link test if the transmission communication link is active, and failing the transmission link test if the transmission communication link is not active.

4. The process of claim 1, further comprising the step of:

querying an electronic control module capable of controlling an engine brake of the status of the engine brake, if engine brake disabled passing the engine brake disabled test, and if not disabled failing the engine brake disabled test.

5. The process of claim 1, further comprising the steps of:

querying the antilock brake Electronic Control Module as to what the Electronic Control Module part and serial numbers are; and comparing firmware software version of the part and serial numbers with the expected software for the part and serial numbers from the data management system, passing the software version test if the software version matches with the expected and failing the software version test if the software version does not match with the expected.

6. The process of claim 1, further comprising the step of:

querying an automatic traction control modulator on the vehicle as to the presence of any self identified faults on in an automatic traction control system, passing the automatic traction control fault test if no faults, and failing the automatic traction control fault test if there are detected faults.

7. The process of claim 1, further comprising the step of:

following the final direction to the driver to release the brakes, querying the driver as to whether an ABS warning light is lit in a cab of the vehicle, passing the warning light off test if the light is not illuminated, and failing the warning light off test if the light is illuminated.

8. The process of claim 7, further comprising the step of:

directing the antilock brake electronic control module to illuminate the ABS warning light in the cab, querying the driver as to whether the ABS warning light is lit in the cab, passing the warning light off test if the light is illuminated, and failing the warning light off test if the light is not illuminated.

9. The process of claim 7, further comprising the step of:

directing the antilock brake electronic control module to de-illuminate the ABS warning light in the cab.

10. The process of claim 1, further comprising the step of:

querying the antilock brake electronic control module as to what battery voltage is for a vehicle electrical system, passing the battery voltage test if voltage is within a preset voltage range, and failing the battery voltage test if voltage is not within the preset voltage range.

11. The process of claim 1, further comprising the steps of:

querying the antilock brake electronic control module as to whether any current detected faults are cleared, and if faults are not cleared, then directing the antilock brake electronic control module to clear the faults; and passing the current faults clear test if the current faults clear and failing the current faults clear test if the faults do not clear.

12. The process of claim 1, further comprising the steps of:

after testing the axle to be tested, directing the driver to move the vehicle to place a second axle to be tested on the rollers;

activating one of the rollers to roll a third rotated wheel of the second axle to be tested;

measuring wheel speed for the rotated wheel through the radial speed sensor for the third rotated wheel of the second axle to be tested and communicated to the testing unit through the antilock brake electronic control module, passing the third wheel speed test if wheel speed within a preset wheel speed range, and failing the third wheel speed test if not within the preset wheel speed range;

measuring rolling resistance of the third rolled wheel through the roller for that wheel, passing the third wheel rolling resistance test if under a preset rolling resistance range, and failing the third wheel rolling resistance test if rolling resistance is at or above the preset rolling resistance range;

activating a second roller of the rollers to roll a fourth wheel of the axle to be tested;

measuring wheel speed for the rotated wheel through the radial speed sensor for the fourth rotated wheel and communicated to the testing unit through the antilock brake electronic control module, passing the fourth wheel speed test if wheel speed within the preset wheel speed range, and failing the fourth wheel speed test if not within the preset wheel speed range;

measuring rolling resistance of the fourth rolled wheel through the roller for that wheel, passing the fourth wheel rolling resistance test if under a preset rolling resistance range, and failing the fourth wheel rolling resistance test if rolling resistance is at or above the preset rolling resistance range;

directing the closure of the hold valve for the fourth wheel of the axle to be tested;

directing the driver of the vehicle to apply the brakes of the vehicle and measuring actuating pressure downstream of the third wheel hold solenoid, passing the fourth wheel hold valve test if actuating fluid pressure is within a preset pressure range around the last value, and failing the fourth wheel hold valve test if actuating fluid pressure is out of the preset pressure range;

directing the driver to release the brakes of the vehicle;

directing the opening of the fourth wheel hold valve;

directing the closure of the third wheel hold valve for the third wheel of the axle to be tested;

directing the driver to apply the brakes of the vehicle and measuring actuating fluid pressure downstream of the third wheel hold solenoid, passing the third wheel hold valve test if actuating fluid pressure is within a preset pressure range around the last value, and failing the third wheel hold valve test if actuating fluid pressure is out of the preset pressure range;

directing the opening of the third wheel hold valve;

measuring individual wheel brake force applied using the rollers for each wheel to measure resistance force;

comparing the measured third wheel brake force to a preset minimum brake force limit, passing the third wheel brake force test if the measured third wheel brake force is greater than the preset minimum brake force limit, and failing the third wheel brake force test if the measured third wheel brake force is less than or equal to the preset minimum brake force limit;

comparing the measured fourth wheel brake force to a preset minimum brake force limit, passing the fourth wheel brake force test if the measured fourth wheel brake force is greater than the preset minimum brake force limit, and failing the fourth wheel brake force test if the measured fourth wheel brake force is less than or equal to the preset minimum brake force limit;

comparing the measured third wheel brake force with the measure fourth wheel brake force to determine a differential brake force from the third wheel to the fourth wheel, passing the brake force wheel differential test if the differential is under a preset brake force differential limit, and failing the brake force wheel differential test if the differential is at or above the preset brake force differential limit;

directing the opening of the fourth wheel decay valve for the fourth wheel of the axle to be tested and measuring actuating fluid pressure for the actuating fluid cylinder for the fourth wheel, passing the fourth wheel decay valve test if actuating fluid pressure is below a preset decay valve pressure limit, and failing the fourth wheel decay valve test if actuating fluid pressure is at or above the preset decay valve pressure limit;

directing closure of the fourth wheel decay valve;

directing the opening of the third wheel decay valve for the third wheel of the axle to be tested and measuring actuating fluid pressure for the actuating fluid cylinder for the third wheel, passing the third wheel decay valve test if actuating fluid pressure is below a preset decay valve pressure limit, and failing the third wheel decay valve test if actuating fluid pressure is at or above the preset decay valve pressure limit;

directing closure of the third wheel decay valve; and directing the driver to release the brakes of the vehicle.

13. A process for testing an antilock brake system for a mobile vehicle, the vehicle having at least two axles with at least two wheels per axle, each wheel on an opposite end of the axle, each wheel having an actuating fluid brake cylinder which when actuating fluid is applied will apply braking force to the associated wheel, each brake cylinder having a supply of actuating fluid through a hold valve and a decay valve, each hold valve being inline with the supply of actuating fluid such that when the hold valve is closed actuating fluid is denied to the associated brake cylinder thereby preventing braking force on the associated wheel, each decay valve being engaged to the brake cylinder such that actuation of the decay valve will cause actuating fluid to be bled off of the associated brake cylinder thereby removing braking force on the associated wheel, an antilock brake electronic control module for controlling operation of the hold valves and decay valves, each wheel having a radial speed sensor for detecting radial speed of the wheels, each radial speed sensor providing a wheel speed signal to the antilock brake electronic control module, the antilock brake electronic control module capable of detecting wheel lock up from the radial speed sensors and capable of adjusting braking force on the associated wheel to remove a detected wheel lockup condition, and the vehicle having an internal electronic network to which the antilock brake electronic control module is engaged, comprising the steps of:

engaging a testing unit to the internal electronic network of the vehicle;

verifying that the internal electronic network is electrically active and communication between the testing unit and the antilock brake electronic control module;

comparing a system configuration from the antilock brake electronic control module with an expected antilock brake configuration for the vehicle for a match, passing the antilock brake configuration test if the actual matches the expected, and failing the configuration test if the actual does not match the expected;

querying the antilock brake electronic control module for any electronic control module firmware self identified faults;

alternatively activating a pair of independent rollers to which each wheel of an axle to be tested rest upon, measuring wheel speed for each rotated wheel through the radial speed sensor for the wheel and communicated to the testing unit through the antilock brake electronic control module, passing each wheel speed test if wheel speed is within a preset wheel speed range, and failing each wheel speed test if each wheel is not within the preset wheel speed range;

alternatively activating the rollers, measuring rolling resistance of each rolled wheel through the roller for that wheel, passing each wheel for the rolling resistance test if measured resistance is under a preset rolling resistance range, and failing each wheel for the rolling resistance test if rolling resistance is at or above the preset rolling resistance range;

alternatively cycling the hold and decay valves for each wheel with the brakes applied, measuring antilock brake actuating fluid pressure to verify operation of each hold and decay valve;

storing results of tests; and disengaging the testing unit from the internal electronic network of the vehicle.

14. The process of claim 13, further comprising the step of:

measuring individual wheel brake force applied with the brakes applied using the rollers for each wheel to measure resistance force, and comparing each individual wheel brake force with an expected minimum brake force limit, passing a wheel if brake force for that wheel is greater than the brake force limit, and failing the wheel if brake force is less than the brake force limit.

15. The process of claim 13, further comprising the step of:

measuring individual wheel brake force applied with the brakes applied using the rollers for each wheel to measure resistance force, and comparing each wheel for a tested axle with the opposite wheel for that axle to come up with a differential brake force from wheel to wheel, passing the wheel to wheel differential brake force test if the differential is less than a preset maximum differential, and failing the wheel to wheel force test if differential is greater than the preset maximum differential limit.

16. A process for testing an antilock brake system for a mobile vehicle, comprising the steps of:

using a testing unit engaged to an internal electronic network of a vehicle, verifying the network active and communication between the testing unit and an antilock brake electronic control module of the vehicle, passing if network active and communications open;

comparing an antilock brake configuration detected from the electronic control module with an expected configuration from a data management system to which the testing unit is in communication with, passing if configuration comparison is a match;

querying the electronic control module for any electronic control module manufacturer program detecting self identified faults, passing if no self identified faults;

alternatively activating rollers to which each wheel for each axle to be tested are engaged to rotate the wheels, measuring wheel speed from on-vehicle sensors engaged to the electronic control module, passing if the detected speed for each wheel is within a preset range;

continuing wheel rotation, measuring each wheels resistance against turning, passing if the resistance for each wheel is under a preset resistance limit;

alternatively cycling antilock brake modulating valves for each wheel with brakes applied, measuring brake actuating fluid pressure to verify operation of each valve, passing if measured pressures for each valve operation are within expected pressure ranges for the specific combination of valve position and brake applied condition; and measuring brake force for each wheel as a function of resistance against the rollers turning the wheels being tested, comparing the individual brake force to a preset minimum value and comparing brake force between wheels on same axle, passing if brake force each wheel tested above minimum and if differential force between wheels of the same axle are below a maximum preset differential value.

17. A testing system for testing an antilock brake system for a mobile vehicle, the vehicle having at least two axles with at least two wheels per axle, each wheel on an opposite end of the axle, each wheel having an actuating fluid brake cylinder which when actuating fluid is applied will apply braking force to the associated wheel, each brake cylinder having a supply of actuating fluid, an antilock brake electronic control module for controlling operation of modulating valves to control the pressure of the actuating fluid at the individual brake cylinders, each wheel having a radial speed sensor for detecting radial speed of the wheels, each radial speed sensor providing a wheel speed signal to the antilock brake electronic control module, the antilock brake electronic control module capable of detecting wheel lock up from the radial speed sensors and capable of adjusting braking force on the associated wheel to remove a detected wheel lockup condition, and the vehicle having an internal electronic network to which the antilock brake electronic control module is engaged, comprising:

a testing unit for electrical engagement to the internal electronic network of the vehicle;

said testing unit in communication with a data management system;

a pair rollers for rotating opposite wheels on an axle of the vehicle to be tested, said rollers being controlled by said testing unit through said data management system;

said testing unit capable of detecting whether the electronic network of the vehicle is active and whether communication is possible with the antilock brake electronic control module;

said testing unit capable of detecting the specific vehicle identification number and of querying said data management system with the vehicle identification number to determine an expect antilock brake system configuration;

said testing unit capable of querying the antilock brake electronic control module for an antilock brake system configuration and comparing the expected configuration with the configuration from the electronic control module;

said testing unit capable of querying the antilock brake electronic control module for any electronic control module firmware self identified faults;

a driver prompt sign controlled by said testing unit through said data management system for querying the driver of vehicle status and giving direction to the driver as to when to apply and when to release a brake pedal of the vehicle;

said testing unit capable of receiving vehicle wheel speed unit through the antilock brake electronic control module and said testing unit capable of comparing the wheel speed with an expected speed from the data management system and determining if wheel speed is as expected during a test;

said rollers capable of measuring wheel resistance against turning to provide an indication of either free movement of a vehicle wheel and braking force on a wheel, and said roller capable of providing wheel resistance information to the testing unit; and said testing unit capable of directing operation of the antilock brake modulating valves through the antilock brake electronic control module along with directions to a driver of the vehicle through driver prompt sign as far as when to apply the brakes of the vehicle, said testing unit capable of receiving actuating fluid pressure indications from the antilock brake electronic control module and comparing the pressure indication with expected parameters for the particular modulator valve operations.

18. The testing system of claim 17, wherein:
said rollers limit wheel rotation speed to that speed corresponding to less than six miles per hour.

19. The testing system of claim 17, wherein:
said testing unit communicates with the data management system through a wireless mode of communication.

20. The testing system of claim 19, wherein said wireless mode of communication is radio waves.

21. The testing system of claim 17, wherein the modulator valves to which said testing unit directs operation include a hold valve and a decay valve for each wheel tested.

22. A testing system for testing an antilock brake system for a mobile vehicle, the vehicle having at least two axles with at least two wheels per axle, each wheel on an opposite end of the axle, each wheel having an actuating fluid brake cylinder which when actuating fluid is applied will apply braking force to the associated wheel, each brake cylinder having a supply of actuating fluid, an antilock brake electronic control module for controlling operation of modulating valves to control the pressure of the actuating fluid at the individual brake cylinders, each wheel having a radial speed sensor for detecting radial speed of the wheels, each radial speed sensor providing a wheel speed signal to the antilock brake electronic control module, the antilock brake electronic control module capable of detecting wheel lock up from the radial speed sensors and capable of adjusting braking force on the associated wheel to remove a detected wheel lockup condition, and the vehicle having an internal electronic network to which the antilock brake electronic control module is engaged, comprising:

a testing unit for electrical engagement to the internal electronic network of the vehicle; said testing unit in communication with a data management system;

a pair rollers for rotating opposite wheels on an axle of the vehicle to be tested, said rollers being controlled by said data management system;

said data management system capable through said testing unit of detecting whether the electronic network of the vehicle is active and whether communication is possible with the antilock brake electronic control module;

said data management system capable through said testing unit of detecting the specific vehicle identification number and of querying said data management system with the vehicle identification number to determine an expect antilock brake system configuration;

said data management system capable through said testing unit of querying the antilock brake electronic control module for an antilock brake system configuration and comparing the expected configuration with the configuration from the electronic control module;

said data management system capable through said testing unit of querying the antilock brake electronic control module for any electronic control module firmware self identified faults;

a driver prompt sign controlled by said testing unit through said data management system for querying the driver of vehicle status and giving direction to the driver as to when to apply and when to release a brake pedal of the vehicle;

said data management system capable through said testing unit of receiving vehicle wheel speed unit through the antilock brake electronic control module and said testing unit capable of comparing the wheel speed with an expected speed from the data management system and determining if wheel speed is as expected during a test;

said rollers capable of measuring wheel resistance against turning to provide an indication of either free movement of a vehicle wheel and braking force on a wheel, and said roller capable of providing wheel resistance information to said data management system capable through said testing unit; and said data management system capable through said testing unit of directing operation of the antilock brake modulating valves through the antilock brake electronic control module along with directions to a driver of the vehicle through driver prompt sign as far as when to apply the brakes of the vehicle, said testing unit capable of receiving actuating fluid pressure indications from the antilock brake electronic control module and comparing the pressure indication with expected parameters for the particular modulator valve operations.

23. The testing system of claim 22, wherein:
said rollers limit wheel rotation speed to that speed corresponding to less than six miles per hour.

24. The testing system of claim 22, wherein:
said testing unit communicates with the data management system through a wireless mode of communication.

25. The testing system of claim 24, wherein said wireless mode of communication is radio waves.

26. The testing system of claim 22, wherein the modulator valves to which said testing unit directs operation include a hold valve and a decay valve for each wheel tested.

27. A portable testing unit for monitoring and testing components on a mobile vehicle, comprising:

a portable computer with a communication connector for plugging in to a vehicle internal electronic network through plug-in outlet on the vehicle;

an interface unit in-series with said portable computer to vehicle communication connector;

a vehicle power supply line through said plug-in connector running in parallel to said communication connector, said power supply line having an in-series power converter which converts vehicle electrical system voltage power to a voltage acceptable to energize and operate said portable computer;

a battery for said portable computer capable of being charged through said vehicle power supply line, said battery capable of energizing and operating said portable computer when said computer is operated in a stand-alone mode;

a scanner electrically engaged to said portable computer through a scanner communication connector, said scanner capable of reading a bar code on a vehicle corresponding to the vehicle identification number of the vehicle, and said scanner capable of providing the vehicle identification number to the portable computer;

said computer capable of correlating the vehicle identification number with stored data relating to vehicle component configuration; and a scanner power connector connected in between said portable computer and said scanner in parallel with said scanner communication connector, said scanner power connector providing electrical energy needs of said scanner directly from said portable computer.

28. The portable testing unit of claim 27, further comprising:

a touch screen interface unit engaged to said portable computer through a touch screen communication connector; and a touch screen power connector connected between said portable computer and said touch screen interface unit, said touch screen power connector in parallel with said touch screen communication connector, and said touch screen power connector providing electrical energy needs of said touch screen interface unit directly from said portable computer.

29. The portable testing unit of claim 28, further comprising:

a wireless communication device engaged to said portable computer to allow communication between said portable computer and an external data management system.

30. The portable testing unit of claim 29, wherein said wireless communication device communicates with radio waves.

31. The portable testing unit of claim 29, wherein said wireless communication device communicates with microwaves.

32. The portable testing unit of claim 27, wherein:

said portable computer programmed for communicating with an external data management system;

said portable computer programmed for controlling a pair rollers for rotating opposite wheels on an axle of the vehicle;

said portable computer programmed for detecting whether the electronic network of the vehicle is active and whether communication is possible with an antilock brake electronic control module of the vehicle;

said stored data of said portable computer relating to vehicle component configuration is expected vehicle antilock brake configuration;

said portable computer programmed for querying an antilock brake electronic control module of the vehicle for an antilock brake system configuration and comparing the expected configuration with the configuration from the electronic control module;

said portable computer programmed for querying the antilock brake electronic control module for any electronic control module firmware self identified faults;

said portable computer programmed for controlling a driver prompt through the data management system for querying the driver of vehicle status and giving direction to the driver as to when to apply and when to release a brake pedal of the vehicle;

said portable computer programmed for receiving vehicle wheel speed unit through the antilock brake electronic control module and said portable computer programmed for comparing the wheel speed with an expected speed from the data management system and determining if wheel speed is as expected during a test;

said portable computer programmed for receiving wheel resistance against turning measurements from the rollers to provide an indication of either free movement of a vehicle wheel and braking force on a wheel when compared with preset expected resistance values;

said portable computer programmed for directing operation of antilock brake modulating valves of the vehicle antilock braking system through the antilock brake electronic control module along with providing directions to a driver of the vehicle through the driver prompt sign as far as when to apply the brakes of the vehicle, said portable computer programmed for receiving actuating fluid pressure indications from the antilock brake electronic control module and comparing the pressure indication with expected parameters for the particular modulator valve operations; and said portable computer capable of storing results of communications, comparisons with expected parameter values and configurations, and queries between said portable computer and said data management system and said antilock brake electronic control module.

33. A computer program product for use with a computer which may communicate with an internal electronic network of a mobile vehicle and with a data management system and components for verifying assembly of an antilock braking system of the vehicle, said computer program product comprising:

a computer useable medium having computer readable program code means embodied in said medium for causing the computer in communication with an internal electronic network of a vehicle to verify the network is active and that there is communication between the computer and an antilock brake electronic control module of the vehicle, and causing the computer to record a passing result if the network is active and there is communication with the antilock brake electronic control module, otherwise causing the computer to record a failing result;

computer readable program means for causing the computer to compare an antilock brake configuration detected from the antilock brake electronic control module with an expected configuration from a data management system to which the computer is in communication, and causing the computer record a passing result if the configuration comparison is a match, otherwise causing the computer to record a failing result;

computer readable program means for causing the computer to query the antilock brake electronic control module for any electronic control module manufacturer program detecting self identified faults, and causing the computer to record a passing result if there are no self identified faults, otherwise causing the computer to record a failing result;

computer readable program means for causing the computer to alternatively activate rollers to which each wheel for each axle to be tested are engaged to rotate the wheels, causing the computer to query and receive measured wheel speed from on-vehicle sensors engaged to the electronic control module, and causing the computer to record a passing result if the detected speed for each wheel is within a preset speed range, otherwise causing the computer to record a failing result;

computer readable program means for causing the computer to direct the roller to continue wheel rotation, causing the computer to query and receive measured each wheels resistance against turning from the rollers, and causing the computer to record a passing result if the resistance for each wheel is under a preset resistance limit, otherwise causing the computer to record a failing result;

computer readable program means for causing the computer to direct the antilock brake electronic control module to alternatively cycle antilock brake modulating valves for each wheel with brakes applied, measuring brake actuating fluid pressure to verify operation of each valve, and causing the computer to record a passing result if measured pressures for each valve operation are within expected pressure ranges for the specific combination of valve position and brake applied condition, otherwise causing the computer to record a failing result; and computer readable program means for causing the computer to query and receive measured brake force for each wheel as a function of resistance against the rollers turning the wheels being tested, causing the computer to compare the individual brake force to a preset minimum value and causing the computer to compare brake force between wheels on same axle, and causing the computer to record a passing result if brake force on each wheel tested is above minimum, otherwise to record a failing result and causing the computer to record a passing result if differential force between wheels of the same axle is below a maximum preset differential value, otherwise to record a failing result.

34. A computer program product for use with a computer which may communicate with an internal electronic network of a mobile vehicle and with a data management system and components for verifying assembly of an antilock braking system of the vehicle, the vehicle having at least two axles with at least two wheels per axle, each wheel on an opposite end of the axle, each wheel having an actuating fluid brake cylinder which when actuating fluid is applied will apply braking force to the associated wheel, each brake cylinder having a supply of actuating fluid through a hold valve and a decay valve, each hold valve being inline with the supply of actuating fluid such that when the hold valve is closed actuating fluid is denied to the associated brake cylinder thereby preventing braking force on the associated wheel, each decay valve being engaged to the brake cylinder such that actuation of the decay valve will cause actuating fluid to be bled off of the associated brake cylinder thereby removing braking force on the associated wheel, an antilock brake electronic control module for controlling operation of the hold valves and decay valves, each wheel having a radial speed sensor for detecting radial speed of the wheels, each radial speed sensor providing a wheel speed signal to the antilock brake electronic control module, the antilock brake electronic control module capable of detecting wheel lock up from the radial speed sensors and capable of adjusting braking force on the associated wheel to remove a detected wheel lockup condition, and the vehicle having an internal electronic network to which the antilock brake electronic control module is engaged, said computer program product comprising:

a computer useable medium having computer readable program code means embodied in said medium for causing the computer in communication with the internal electronic network of a vehicle to verify that the internal electronic network is electrically active, and causing the computer to record a passing result for the network active test if active, and causing the computer to record a failing result for the network active test if not active;

computer readable program means for causing the computer to verify communication through between the computer and the antilock brake electronic module, passing the communication test if open communication is found, and failing the communication test if no communication between the computer and the antilock brake electronic module;

computer readable program means for causing the computer to identify the vehicle by vehicle identification number using a bar code reader engaged to the computer; computer readable program means for causing the computer to query a data management system in communication with the computer as to an expected antilock brake configuration for the vehicle;

computer readable program means for causing the computer to query the antilock brake electronic control module for system configuration;

computer readable program means for causing the computer to compare the system configuration from the antilock brake electronic control module with the expected antilock brake configuration for a match, causing the computer to record a passing result for the antilock brake configuration test if the actual matches the expected, and causing the computer to record a failing result for the configuration test if the actual does not match the expected;

computer readable program means for causing the computer to query the antilock brake electronic control module for existence of any electronic control module firmware self identified faults, causing the computer to record a passing result if no firmware self identified faults, and causing the computer to record a failing result if there are firmware self identified faults;

computer readable program means for causing the computer to query and receive from a driver of the vehicle which axle of the vehicle is aligned to a pair of independent rollers with one wheel on each roller to identify the axle to be tested;

computer readable program means for causing the computer to activate one of the rollers to roll a first rotated wheel of the axle to be tested;

computer readable program means for causing the computer to query and receive measured wheel speed for the rotated wheel through the radial speed sensor for the first rotated wheel and communicated to the computer through the antilock brake electronic control module, causing the computer to record a passing result for the first wheel speed test if wheel speed within a preset wheel speed range, and causing the computer to record a failing result for the first wheel speed test if not within the preset wheel speed range;

computer readable program means for causing the computer to query and receive measured rolling resistance of the first rolled wheel through the roller for that wheel, causing the computer to record a passing result for the first wheel rolling resistance test if under a preset rolling resistance range, and causing the computer to record a failing result for the first wheel rolling resistance test if rolling resistance is at or above the preset rolling resistance range;

computer readable program means for causing the computer to activate a second roller of the rollers to roll a second wheel of the axle to be tested;

computer readable program means for causing the computer to query and receive measured wheel speed for the rotated wheel through the radial speed sensor for the second rotated wheel and communicated to the computer through the antilock brake electronic control module, causing the computer to record a passing result for the second wheel speed test if wheel speed within the preset wheel speed range, and causing the computer to record a failing result for the second wheel speed test if not within the preset wheel speed range;

computer readable program means for causing the computer to query and receive measured rolling resistance of the second rolled wheel through the roller for that wheel, causing the computer to record a passing result for the second wheel rolling resistance test if under a preset rolling resistance range, and causing the computer to record a failing result for the second wheel rolling resistance test if rolling resistance is at or above the preset rolling resistance range;

computer readable program means for causing the computer to direct the closure of the hold valve for the second wheel of the axle to be tested;

computer readable program means for causing the computer to direct the driver of the vehicle to apply the brakes of the vehicle and causing the computer to query and receive measured actuating pressure downstream of the first wheel hold solenoid, causing the computer to record a passing result for the second wheel hold valve test if actuating fluid pressure is within a preset pressure range around the last value, and causing the computer to record a failing result for the second wheel hold valve test if actuating fluid pressure is out of the preset pressure range;

computer readable program means for causing the computer to direct the driver to release the brakes of the vehicle;

computer readable program means for causing the computer to direct the opening of the second wheel hold valve;

computer readable program means for causing the computer to direct the closure of the first wheel hold valve for the first wheel of the axle to be tested;

computer readable program means for causing the computer to direct the driver to apply the brakes of the vehicle and causing the computer to query and receive measured actuating fluid pressure downstream of the first wheel hold solenoid, causing the computer to record a passing result for the first wheel hold valve test if actuating fluid pressure is within a preset pressure range around the last value, and causing the computer to record a failing result for the first wheel hold valve test if actuating fluid pressure is out of the preset pressure range;

computer readable program means for causing the computer to direct the opening of the first wheel hold valve;

computer readable program means for causing the computer to query and receive measured individual wheel brake force applied using the rollers for each wheel to measure resistance force;

computer readable program means for causing the computer to compare the measured first wheel brake force to a preset minimum brake force limit, causing the computer to record a passing result for the first wheel brake force test if the measured first wheel brake force is greater than the preset minimum brake force limit, and causing the computer to record a failing result for the first wheel brake force test if the measured first wheel brake force is less than or equal to the preset minimum brake force limit;

computer readable program means for causing the computer to compare the measured second wheel brake force to a preset minimum brake force limit, causing the computer to record a passing result for the second wheel brake force test if the measured second wheel brake force is greater than the preset minimum brake force limit, and causing the computer to record a failing result for the second wheel brake force test if the measured second wheel brake force is less than or equal to the preset minimum brake force limit;

computer readable program means for causing the computer to compare the measured first wheel brake force with the measure second wheel brake force to determine a differential brake force from the first wheel to the second wheel, causing the computer to record a passing result for the brake force wheel differential test if the differential is under a preset brake force differential limit, and causing the computer to record a failing result for the brake force wheel differential test if the differential is at or above the preset brake force differential limit;

computer readable program means for causing the computer to direct the opening of the second wheel decay valve for the second wheel of the axle to be tested and causing the computer to query and receive measured actuating fluid pressure for the actuating fluid cylinder for the second wheel, causing the computer to record a passing result for the second wheel decay valve test if actuating fluid pressure is below a preset decay valve pressure limit, and causing the computer to record a failing result for the second wheel decay valve test if actuating fluid pressure is at or above the preset decay valve pressure limit;

computer readable program means for causing the computer to direct closure of the second wheel decay valve;

computer readable program means for causing the computer to direct the opening of the first wheel decay valve for the first wheel of the axle to be tested and causing the computer to query and receive measured actuating fluid pressure for the actuating fluid cylinder for the first wheel, causing the computer to record a passing result for the first wheel decay valve test if actuating fluid pressure is below a preset decay valve pressure limit, and causing the computer to record a failing result for the first wheel decay valve test if actuating fluid pressure is at or above the preset decay valve pressure limit;

computer readable program means for causing the computer to direct closure of the first wheel decay valve;

computer readable program means for causing the computer to direct the driver to release the brakes of the vehicle; and computer readable program means for causing the computer to store results of tests.

35. The computer program product of claim 34, comprising:

computer readable program means for causing the computer to query an engine electronic control module of the vehicle as to the status of a communication link between the engine electronic control module and the internal electronic network of the vehicle, causing the computer to record a passing result for the engine link test if the engine communication link is active, and causing the computer to record a failing result for the engine link test if the engine communication link is not active.

36. The computer program product of claim 34, further comprising:

computer readable program means for causing the computer to query a transmission electronic control module of the vehicle as to the status of a communication link between the transmission electronic control module and the internal electronic network of the vehicle, causing the computer to record a passing result for the transmission link test if the transmission communication link is active, and causing the computer to record a failing result for the transmission link test if the transmission communication link is not active.

37. The computer program product of claim 34, further comprising:

computer readable program means for causing the computer to query an electronic control module capable of controlling an engine brake of the status of the engine brake, if engine brake disabled causing the computer to record a passing result for the engine brake disabled test, and if not disabled causing the computer to record a failing result for the engine brake disabled test.

38. The computer program product of claim 34, further comprising:

computer readable program means for causing the computer to query the antilock brake Electronic Control Module as to what the Electronic Control Module part and serial numbers are; and computer readable program means for causing the computer to compare firmware software version of the part and serial numbers with the expected software for the part and serial numbers from the data management system, causing the computer to record a passing result for the software version test if the software version matches with the expected and causing the computer to record a failing result for the software version test if the software version does not match with the expected.

39. The computer program product of claim 34, further comprising:

computer readable program means for causing the computer to query an automatic traction control modulator on the vehicle as to the presence of any self identified faults on in an automatic traction control system, causing the computer to record a passing result for the automatic traction control fault test if no faults, and causing the computer to record a failing result for the automatic traction control fault test if there are detected faults.

40. The computer program product of claim 34, further comprising:

following the final direction to the driver to release the brakes, computer readable program means for causing the computer to query the driver as to whether an ABS warning light is lit in a cab of the vehicle, passing the warning light off test if the light is not illuminated, and failing the warning light off test if the light is illuminated.

41. The computer program product of claim 40, further comprising:

computer readable program means for causing the computer to direct the antilock brake electronic control module to illuminate the ABS warning light in the cab;

computer readable program means for causing the computer to query the driver as to whether the ABS warning light is lit in the cab; and causing the computer to record a passing result for the warning light off test if the light is illuminated, and causing the computer to record a failing result for the warning light off test if the light is not illuminated.

42. The computer program product of claim 41, further comprising:

computer readable program means for causing the computer to direct the antilock brake electronic control module to de-illuminate the ABS warning light in the cab.

43. The computer program product of claim 34, further comprising:

computer readable program means for causing the computer to query the antilock brake electronic control module as to what battery voltage is for a vehicle electrical system, causing the computer to record a passing result for the battery voltage test if voltage is within a preset voltage range, and causing the computer to record a failing result for the battery voltage test if voltage is not within the preset voltage range.

44. The computer program product of claim 34, further comprising:

computer readable program means for causing the computer to query the antilock brake electronic control module as to whether any current detected faults are cleared, and if faults are not cleared, then causing the computer to direct the antilock brake electronic control module to clear the faults; and causing the computer to record a passing result for the current faults clear test if the current faults clear and causing the computer to record a failing result for the current faults clear test if the faults do not clear.

* * * * *